US010387858B2

(12) United States Patent
Novak et al.

(10) Patent No.: US 10,387,858 B2
(45) Date of Patent: Aug. 20, 2019

(54) INTEGRATED ELECTRONIC CASH FLOW MANAGEMENT SYSTEM AND METHOD

(71) Applicant: JPMorgan Chase Bank, N.A., New York, NY (US)

(72) Inventors: Jamie L. Novak, Powell, OH (US); Richard B. Walcutt, Galena, OH (US); Stanley M. DeVan, Jr., Mount Royal, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 32 days.

(21) Appl. No.: 13/773,855

(22) Filed: Feb. 22, 2013

(65) Prior Publication Data

US 2014/0222669 A1 Aug. 7, 2014

Related U.S. Application Data

(60) Provisional application No. 61/762,077, filed on Feb. 7, 2013.

(51) Int. Cl.

| | |
|---|---|
| ***G06Q 20/14*** | (2012.01) |
| ***G06Q 30/04*** | (2012.01) |
| ***G06Q 40/00*** | (2012.01) |

(52) U.S. Cl.
CPC ............ *G06Q 20/14* (2013.01); *G06Q 30/04* (2013.01); *G06Q 40/12* (2013.12); *G06Q 40/128* (2013.12)

(58) Field of Classification Search
CPC ...... G06Q 20/00; G06Q 20/102; G06Q 40/00; G06Q 20/14; G06Q 30/04

(Continued)

(56) References Cited

U.S. PATENT DOCUMENTS

| | | |
|---|---|---|
| 4,375,032 A | 2/1983 | Uchida et al. |
| 4,423,313 A | 12/1983 | Tanigaki et al. |

(Continued)

FOREIGN PATENT DOCUMENTS

| | | |
|---|---|---|
| CA | 2275211 | 6/1998 |
| EP | 0825544 | 2/1998 |

(Continued)

OTHER PUBLICATIONS

"Legner C, Wende K, "Electronic bill presentment and payment", 2006, www.unisg.ch" (Year: 2006).*

(Continued)

*Primary Examiner* — Eric T Wong
*Assistant Examiner* — Kevin T Poe
(74) *Attorney, Agent, or Firm* — Greenblum & Bernstein, P.L.C.

(57) ABSTRACT

A cash flow management system is provided within a host system for facilitating cash flow management for businesses. The cash flow management system includes an electronic billing and invoicing computing system enabling generation and transmission of electronic bills based on business invoices and for displaying the generated bills for payment and an integrated receivables and reconciliation system receiving notification of received payments and for matching received payments with the generated invoices. The system additionally includes a communication interface for allowing the cash flow management system to communicate with multiple financial management systems accessible to the host enterprise, the systems including at least an accounting system, the integrated receivables management system receiving information from the financial management systems within the host system to facilitate management of cash flow for the businesses using the cash flow management system for electronic billing.

32 Claims, 29 Drawing Sheets

(58) Field of Classification Search
USPC ........................................................ 705/40
See application file for complete search history.

(56) References Cited

U.S. PATENT DOCUMENTS

| | | | |
|---|---|---|---|
| 4,423,318 | A | 12/1983 | Gotou et al. |
| 4,587,379 | A | 5/1986 | Masuda et al. |
| 4,594,663 | A | 6/1986 | Nagata et al. |
| 4,713,761 | A | 12/1987 | Sharpe et al. |
| RE32,985 | E | 7/1989 | Nagata et al. |
| 4,877,947 | A | 10/1989 | Mori et al. |
| 5,220,501 | A | 6/1993 | Lawlor et al. |
| 5,465,206 | A | 11/1995 | Hilt et al. |
| 5,604,802 | A | 2/1997 | Holloway et al. |
| 5,655,089 | A | 8/1997 | Bucci |
| 5,669,528 | A | 9/1997 | Romero et al. |
| 5,699,528 | A | 12/1997 | Hogan |
| 5,809,483 | A | 9/1998 | Broka et al. |
| 5,832,460 | A | 11/1998 | Bednar et al. |
| 5,903,881 | A | 5/1999 | Schrader et al. |
| 5,930,773 | A | 7/1999 | Crooks et al. |
| 5,943,656 | A | 8/1999 | Crooks et al. |
| 5,963,925 | A | 10/1999 | Kolling et al. |
| 6,039,245 | A | 3/2000 | Symonds et al. |
| 6,052,671 | A | 4/2000 | Crooks et al. |
| 6,070,150 | A | 5/2000 | Remington et al. |
| 6,078,891 | A | 6/2000 | Riordan et al. |
| 6,078,907 | A | 6/2000 | Lamm |
| 6,128,603 | A | 10/2000 | Dent et al. |
| 6,292,789 | B1 | 9/2001 | Schutzer |
| 6,334,116 | B1 | 12/2001 | Ganesan et al. |
| 6,374,229 | B1 | 4/2002 | Lowrey |
| 6,385,595 | B1 | 5/2002 | Kolling et al. |
| 6,493,685 | B1 | 12/2002 | Ensel et al. |
| 6,505,173 | B1 | 1/2003 | Weibel et al. |
| 6,519,572 | B1 | 2/2003 | Riordan et al. |
| 6,578,015 | B1 | 6/2003 | Haseltine et al. |
| 6,606,606 | B2 | 8/2003 | Starr |
| 6,609,113 | B1 | 8/2003 | O'Leary et al. |
| 6,678,664 | B1 | 1/2004 | Ganesan |
| 6,832,212 | B1 | 12/2004 | Zenner et al. |
| 6,880,079 | B2 | 4/2005 | Kefford et al. |
| 7,516,101 | B2 | 4/2009 | Remington et al. |
| 7,523,057 | B1 | 4/2009 | Cornelius |
| 7,685,006 | B2 * | 3/2010 | Rahn et al. ....................... 705/3 |
| 7,792,749 | B2 | 9/2010 | Ganesan |
| 8,190,504 | B1 | 5/2012 | Stolz et al. |
| 8,275,702 | B1 | 9/2012 | Enriquez |
| 8,290,865 | B2 | 10/2012 | Lawrence et al. |
| 8,326,754 | B2 | 12/2012 | Bandych et al. |
| 8,352,365 | B1 | 1/2013 | Goldberg et al. |
| 8,401,892 | B2 | 3/2013 | Stone et al. |
| 8,583,548 | B1 * | 11/2013 | Goldstein .............. G06Q 30/04 705/14.23 |
| 2002/0019808 | A1 * | 2/2002 | Sharma ........................... 705/40 |
| 2002/0065772 | A1 | 5/2002 | Saliba et al. |
| 2003/0023492 | A1 | 1/2003 | Riordan et al. |
| 2003/0088460 | A1 | 5/2003 | Riordan et al. |
| 2003/0099337 | A1 * | 5/2003 | Lord .......................... 379/93.12 |
| 2003/0135413 | A1 * | 7/2003 | Nishi et al. ..................... 705/14 |
| 2004/0019553 | A1 | 1/2004 | Setz et al. |
| 2004/0035923 | A1 | 2/2004 | Kahr |
| 2004/0054685 | A1 * | 3/2004 | Rahn et al. ................... 707/102 |
| 2005/0049893 | A1 * | 3/2005 | Tien .................................. 705/1 |
| 2005/0075978 | A1 * | 4/2005 | Leavitt .................. G06Q 20/00 705/40 |
| 2005/0161502 | A1 | 7/2005 | Smith et al. |
| 2005/0177470 | A1 * | 8/2005 | Tandon et al. .................. 705/30 |
| 2005/0246275 | A1 * | 11/2005 | Nelson ................ G06Q 20/102 705/40 |
| 2006/0036526 | A1 | 2/2006 | Ramos et al. |
| 2006/0178954 | A1 * | 8/2006 | Thukral et al. ................. 705/28 |
| 2006/0259354 | A1 * | 11/2006 | Yan ..................... G06Q 20/127 705/13 |
| 2007/0038564 | A1 * | 2/2007 | Leavitt et al. ................. 705/40 |
| 2007/0112629 | A1 | 5/2007 | Solomon et al. |
| 2008/0021822 | A1 | 1/2008 | Hinton et al. |
| 2008/0275802 | A1 * | 11/2008 | Verfuerth ............... G06Q 30/00 705/35 |
| 2009/0164329 | A1 | 6/2009 | Bishop et al. |
| 2010/0100480 | A1 * | 4/2010 | Altman ................. G06Q 10/10 705/40 |
| 2010/0223160 | A1 | 9/2010 | Brown |
| 2010/0299251 | A1 * | 11/2010 | Thomas ................. G06Q 20/10 705/39 |
| 2011/0119366 | A1 | 5/2011 | Elman et al. |
| 2011/0131096 | A1 | 6/2011 | Frew et al. |
| 2012/0084178 | A1 | 4/2012 | Ehbauer et al. |
| 2013/0013472 | A1 | 1/2013 | Votaw et al. |
| 2013/0022231 | A1 * | 1/2013 | Nepomniachtchi .. G06Q 20/042 382/102 |
| 2013/0030962 | A1 | 1/2013 | Erle et al. |
| 2014/0040159 | A1 * | 2/2014 | Caron et al. ................. 705/342 |

FOREIGN PATENT DOCUMENTS

| | | | |
|---|---|---|---|
| EP | 1016047 | A2 | 7/2000 |
| EP | 1049056 | A2 | 11/2000 |
| EP | 1052603 | A2 | 11/2000 |
| EP | 1087349 | A2 | 3/2001 |
| EP | 1091330 | A2 | 4/2001 |
| EP | 1122676 | A1 | 8/2001 |
| EP | 1291794 | A1 | 3/2003 |
| EP | 1338998 | A2 | 8/2003 |
| EP | 2028614 | A2 | 2/2009 |
| WO | WO-1999005628 | A1 | 2/1999 |
| WO | WO-1999013421 | A2 | 3/1999 |
| WO | WO-1999015999 | A1 | 4/1999 |
| WO | WO-2000058876 | A1 | 10/2000 |
| WO | WO-2001025997 | | 4/2001 |
| WO | WO-2001041020 | | 6/2001 |
| WO | WO-2001052142 | A2 | 7/2001 |
| WO | WO-2001057745 | A2 | 8/2001 |
| WO | WO-2001057753 | A1 | 8/2001 |
| WO | WO-2001080102 | A1 | 10/2001 |
| WO | WO-2001091066 | A2 | 11/2001 |

OTHER PUBLICATIONS

"Keifer Steve, "E-Invoicing: The catalyst for financial supply chain efficiencies", 2011 Journal of Payment Strategy & Systems vol. 5 No. 1" (Year: 2011).*

"Gal Avigdor, Anaby-Tavor Ateret, Trombetta Alberto, Montesi Danilo," A framework for modeling and evaluating semantic reconciliation, 2005 VLDB Journal 14 :50-67/ Digital Object Identifier (Year: 2005).*

PCT International Search Report dated Jul. 8, 2014.

PCT International Search Report dated Jun. 23, 2015.

* cited by examiner

2000

2010

2020

FIG 21
CHASE
BUSINESS
P2P BUSINESS MANAGER

2100

2400

2500

2700

INTEGRATED ELECTRONIC CASH FLOW MANAGEMENT SYSTEM AND METHOD

RELATED APPLICATIONS

This application claims priority from U.S. Provisional Application Ser. No. 61/762,077, filed on Feb. 7, 2013. This application is related to U.S. Pat. No. 7,949,579 and U.S. patent application Ser. Nos. 60/215,003 and 13/735,090, which are hereby incorporated by reference in their entirety.

TECHNICAL FIELD

Embodiments of the invention are related generally to systems and methods for cash flow and integrated receivables management, with particular applicability to small business cash flow and receivables management

BACKGROUND OF THE INVENTION

Over the past several years, consumers have realized the convenience of electronic bill payment and billers are recognizing the reduced costs and reductions in late fees and delinquent payments. Furthermore, various e-commerce or e-business solutions have become available that allow individuals to perform financial transactions over the Internet through a secure website. This type of service enables customers to do their banking or financial transaction processing from anywhere where Internet access is available. In many cases, a web browser is utilized and any normal Internet connection is suitable. Thus, electronic billing and online financial transactions have become commonplace.

However, problems existing online systems, particularly with respect to electronic bill payment systems both for small business billers and for consumer payers. With respect to consumers, while consumers enjoy the convenience of electronic payment, they are often forced to receive bills from many different sources, e.g. phone company, gas company, electric company, mortgage lender, etc. Each bill is available through a different system and consumers are often required to log into these systems individually in order to pay their bills. The systems often have different passwords and usernames and it is virtually impossible for users to keep track of all of these.

As a result, third party aggregators have evolved to aggregate bills from multiple billers and allow consumers to access all of the bills from one centralized location. However, these third party aggregators are typically not available to small business billers and therefore consumers still have numerous bills that must be transmitted and paid through alternative channels. Furthermore, third party aggregators are often unavailable or undesirable for small business users, particularly businesses with a local client base.

While some financial institutions offer electronic billing (ebilling) services, these services are provided only for bank customers. Accordingly, the lack of centralization remains a problem for both businesses and consumers. While consumers are nearly universally able to pay bills electronically from their own banks, the consumers can add payees but are not offered billing details. Thus consumers receive bills from an alternative source, such as through the mail or electronically from the business directly. In order to pay the bill, particularly to small businesses that often do not accept credit cards, the consumer may have to use a payment service such as Paypal™, mail a paper check, or log into the consumer's own bank and have a check mailed to the business.

Additionally, even if customers and businesses are able to receive and pay bills through a third party aggregator, these bills are not linked to financial information, which is typically only available through a financial institution. Thus, payment of bills and receipt of bills is not visually linked to accounts or to any type of accounting system. Therefore, in order to get a larger financial picture, customers must access disparate systems and review the information available from all of these systems.

For small business owners, the payables and receivables environment is typically fragmented and includes multiple tools and programs that focus on only individual components of cash flow. These disjointed payables and receivable processes can have a negative impact on cash flow due to the incomplete overview available to business owners. Typically, small business owners are required to rekey data in order to manually reconcile payments with invoices. Furthermore, small business owners typically rekey data and manually manage reimbursements to employees. Additionally, small business owners do not have one consolidated view of their cash flow and are required to visit multiple sources in order to assess cash flow status.

Accordingly, a solution is needed that provides customers, particularly small businesses with an integrated receivables solution that tracks from estimate to invoice to receipt of payment, and integrates data into accounting and financial management software. The solution should show a complete cash flow picture by creating an experience that manages movement of money from start to finish and offers business owners real time transparency. To further enhance convenience, consumers and businesses both want to handle cash flow while in transit. Therefore, a need exists and a solution is needed for convenient mobile interfaces for generating and paying electronic bills.

SUMMARY OF THE INVENTION

An embodiment of the invention includes a cash flow management system for facilitating bill payment and reconciliation. The system includes at least one computer memory storing data, the data including business data and consumer data and at least one computer processor accessing the stored data and executing stored instructions to perform multiple steps. The steps include generating electronic invoices on behalf of businesses for goods or services provided to consumers, each generated invoice having identifying information, and transmitting the electronic invoices to the consumers using at least one of multiple selectable transmission methods. The steps additionally include receiving notification of consumer payment of the invoices through one of multiple selectable payment methods, the multiple selectable payment methods including multiple payment sources and multiple payment channels, and automatically matching each consumer invoice payment with a generated invoice. The matching process may include determining, upon receiving notification of the payment, whether the payment is linked to an invoice, and performing an automatic matching process for payments not linked to an invoice. The method further includes automatically updating business accounting records for the businesses based on each matched payment and invoice.

In an additional aspect of the invention, a cash flow management system is provided within a host system for facilitating cash flow management for businesses. The cash flow management system includes an electronic billing and invoicing computing system enabling generation and transmission of electronic bills based on business invoices and for displaying the generated bills for payment. The cash flow management system further includes an integrated receivables and reconciliation computing system for receiving notification of payments and for matching received payments with the generated invoices. The cash flow management system additionally includes a communication interface for allowing the integrated receivables management system to communicate with multiple financial management systems accessible to the host system, the systems including at least an accounting system, the integrated receivables management system receiving information from the financial management systems to facilitate management of cash flow for the businesses using the integrated receivables management system for electronic billing.

In another aspect of the invention, a cash flow management method is provided for facilitating cash flow management for businesses. The cash flow management method may include storing, in at least one computer memory, data accessible to the cash flow management system, the data including biller data and payer data. The method may additionally include implementing at least one computer processor for accessing the stored data and executing instructions to perform multiple steps. The steps may include generating and transmitting electronic bills based on business invoices and displaying the generated bills for payment. The method may additionally include receiving notification of received payments through multiple channels and matching the received payments with the generated invoices. The method may further include communicating with multiple financial systems, including an accounting system accessible to the cash flow management system to update the systems upon receipt of payment for the generated invoices. The method additionally includes generating at least one user interface to provide billers with updated cash flow information based on the matched payments and invoices to facilitate management of cash flow for the businesses using the cash flow management system for electronic billing.

In a further aspect of the invention, a cash flow management method is provided, the method implementing a host system for facilitating bill payment and reconciliation. The method includes storing data, the data including both business data and consumer data in at least one computer memory and accessing the stored data and executing stored instructions using at least one computer processor to perform multiple steps. The steps include generating electronic invoices on behalf of businesses for goods or services provided to consumers, each generated invoice having identifying information and transmitting the electronic invoices to the consumers using at least one of multiple selectable transmission methods. The method additionally includes receiving notification of consumer payment of the invoices through one of multiple selectable payment methods, the multiple selectable payment methods including multiple payment sources and multiple payment channels and matching each consumer invoice payment with a generated invoice. Matching includes determining, upon receiving notification of the payment, whether the payment is linked to an invoice and performing an automatic matching process for payments not linked to an invoice. The method additionally includes updating business accounting records for the businesses based on each matched payment and invoice.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a system and method for providing customers, particularly small businesses, with a cash flow management solution that tracks financial activity from estimate to invoice, to receipt of payment, and integrates data into accounting and financial management software.

Embodiments of the system have an open architecture that facilitates integration with external software providers including invoicing and accounting software, such as Quickbooks™, to create an integrated product suite. Thus, in embodiments of the invention, if a business customer sends an invoice, any payment against that invoice will be automatically identified and reconciled against the invoice. Accordingly, embodiments of the invention offer a consistent experience across devices and channels.

Figure 1:
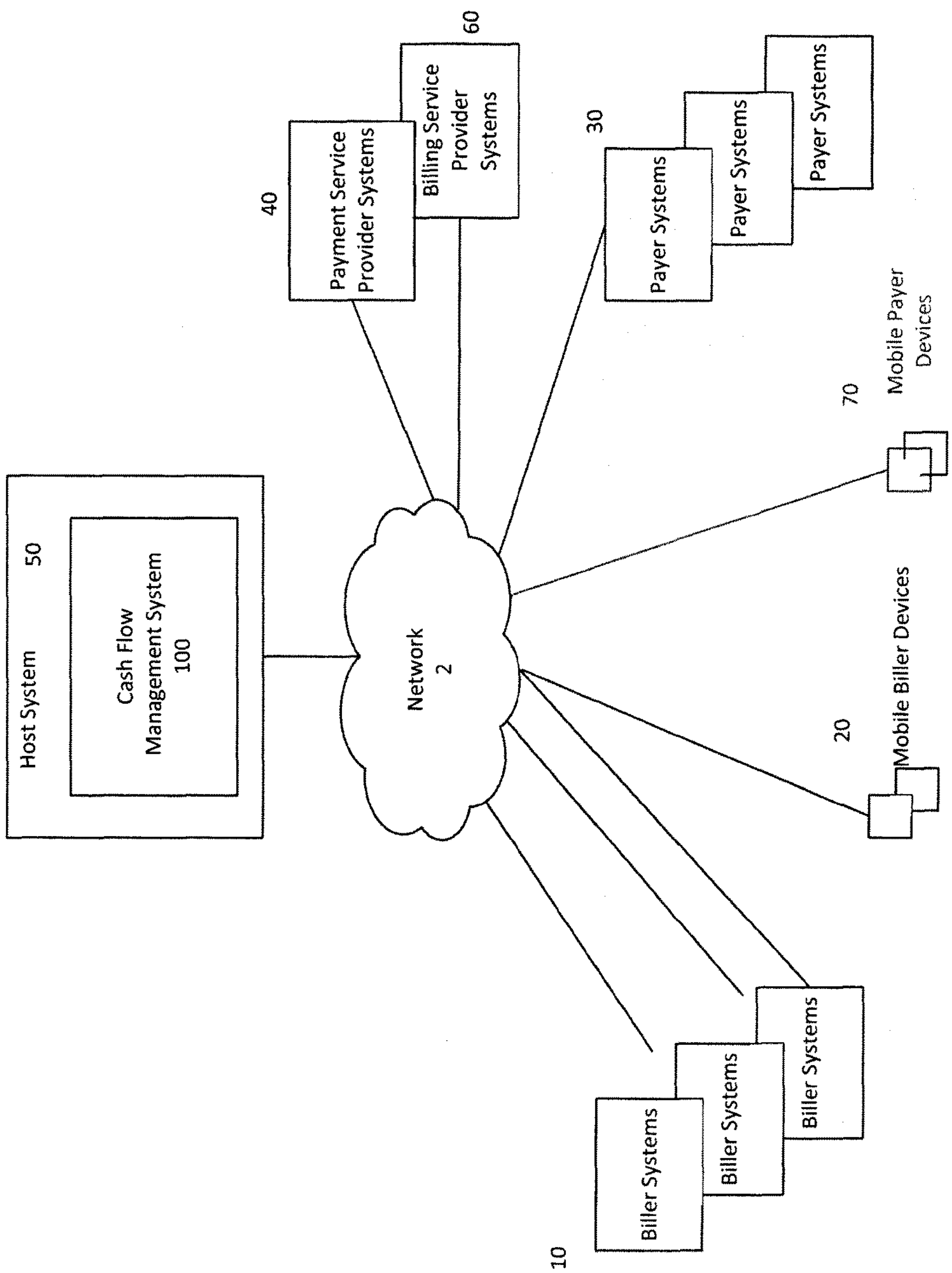
FIG. 1 is a block diagram illustrating an operating environment for a cash flow management system in accordance with an embodiment of the invention.

FIG. 1 is a block diagram illustrating an operating environment for a cash flow management 100 system in accordance with an embodiment of the invention. A host system 50 includes the cash flow management system 100. These systems are connected over a network 2 with other systems including biller systems 10, mobile biller systems 20, payer systems 30, mobile payer devices 70, payment service providers 40, and billing service providers 60. Other external systems may also be connected.

The host system 50 may be or include a host platform at a financial services firm or financial institution. Accordingly, the host system 50 may include many financial management systems that are not shown. For example, the host system 50 may include account processing systems, credit card processing systems, and other known financial systems. The host system 50 preferably provides a website for customers and through this website, billers may leverage the cash flow management system 100 disclosed herein and payers may access electronic bill payment functions also described herein.

The cash flow management system 100 provides a financial management framework and may be constructed with particular focus on small businesses. As will be further set forth below, the cash flow management system 100 simplifies cash flow management for business owners and allows convenient visualization of cash flow for businesses.

The network 2 is preferably the Internet, but may be or include other types of networks. Furthermore, even though only one network is shown, multiple networks may be used. For example, payment service provider systems 40 may communicate over a different network with the cash flow management system 100 and payer systems 30. The network 2 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The biller systems 10 may include computing systems adapted for business use. Thus the biller systems 10 may include at least one processor and multiple applications executed on the processor capable of performing accounting functions, invoicing functions, and other financial processing functions. Alternatively or additionally, the biller systems 10 may include a browser for accessing financial software applications provided by the host system 50 or other connected systems that offer such functionality over the Internet or any other network.

The mobile biller systems 20 also interface with the cash flow management system 100. The mobile biller systems 20 may be or include any handheld mobile devices with internet access such as iPhones™ or other mobile, phones, tablets, or any other known devices. The mobile biller systems 20 may execute downloadable applications for operating in conjunction with the cash flow management system 100. The downloadable applications may be stored in memory and executed by processors on the mobile biller devices 20 and may provide a plurality of user interfaces. The downloadable applications may include, for example, applications that when executed, facilitate receipt capture or invoice capture using integral features. For example, the mobile biller systems 20 may include cameras, gyroscopes, and accelerometers. Image capture applications may leverage these integral features.

The payer systems 30 may also include any types of computing systems including desktop or laptop computers or mobile devices. These payer systems 30 may also be equipped with image capture equipment for capturing receipts and invoices for later use. The payer systems 30 may include a browser capable of accessing online bill payment systems and other financial management systems. The mobile payer systems 20 may be or include any handheld mobile devices with internet access such as iPhones™ or other mobile, phones, tablets, or any other known devices. The mobile payer devices 70 may execute downloadable applications for operating in conjunction with the cash flow management system 100. The downloadable applications may be stored in memory and executed by processors on the mobile payer devices 70 and may provide a plurality of user interfaces. The downloadable applications may include, for example, applications that when executed, facilitate receipt capture or invoice capture using integral features. For example, the mobile payer devices 70 may include cameras, gyroscopes, and accelerometers. Image capture applications may leverage these integral features.

From the payer systems 30 or payer mobile devices 70, payers may receive notification of available billers and have the ability to pay through the devices or systems using multiple options. The options may include, for example, a financial institution online bill payment system, such as Chase Online Bill Pay. Using this option, payers who hold accounts with the financial institution may respond to a push notification from a mobile application to schedule a payment or select en embedded email link for automatic payment. In embodiments of the invention, these actions may be executed without the need for customer login. In embodiments of the invention, similar functionality through the mobile application may be available to payers who do not hold accounts with the financial institution. As an additional options, payer functionality may allow for scanning of a QR code on a printed invoice in order to automatically create a payment through the mobile application.

The payment service provider systems 40 may be operated by payment service providers (PSPs) that offer businesses online services for accepting electronic payments by a variety of payment methods including credit card, bank-based payments such as direct debit, bank transfer, and real-time bank transfer based on online banking. Some PSPs provide services to process other next generation methods (Payment systems) including cash payments, wallets such as PayPal™, Adyen™, and WebMoney™, prepaid cards or vouchers, and even paper or e-check processing. Typically, a PSP can connect to multiple acquiring banks, card, and payment networks. In many cases, the PSP will fully manage these technical connections, relationships with the external network, and bank accounts.

The billing service providers (BSPs) 60 may be or include be third party aggregators, which collect bills from multiple businesses for display to payers. They can also create biller direct sites, where customers can view and pay their bills at the biller's web site.

Figure 2:
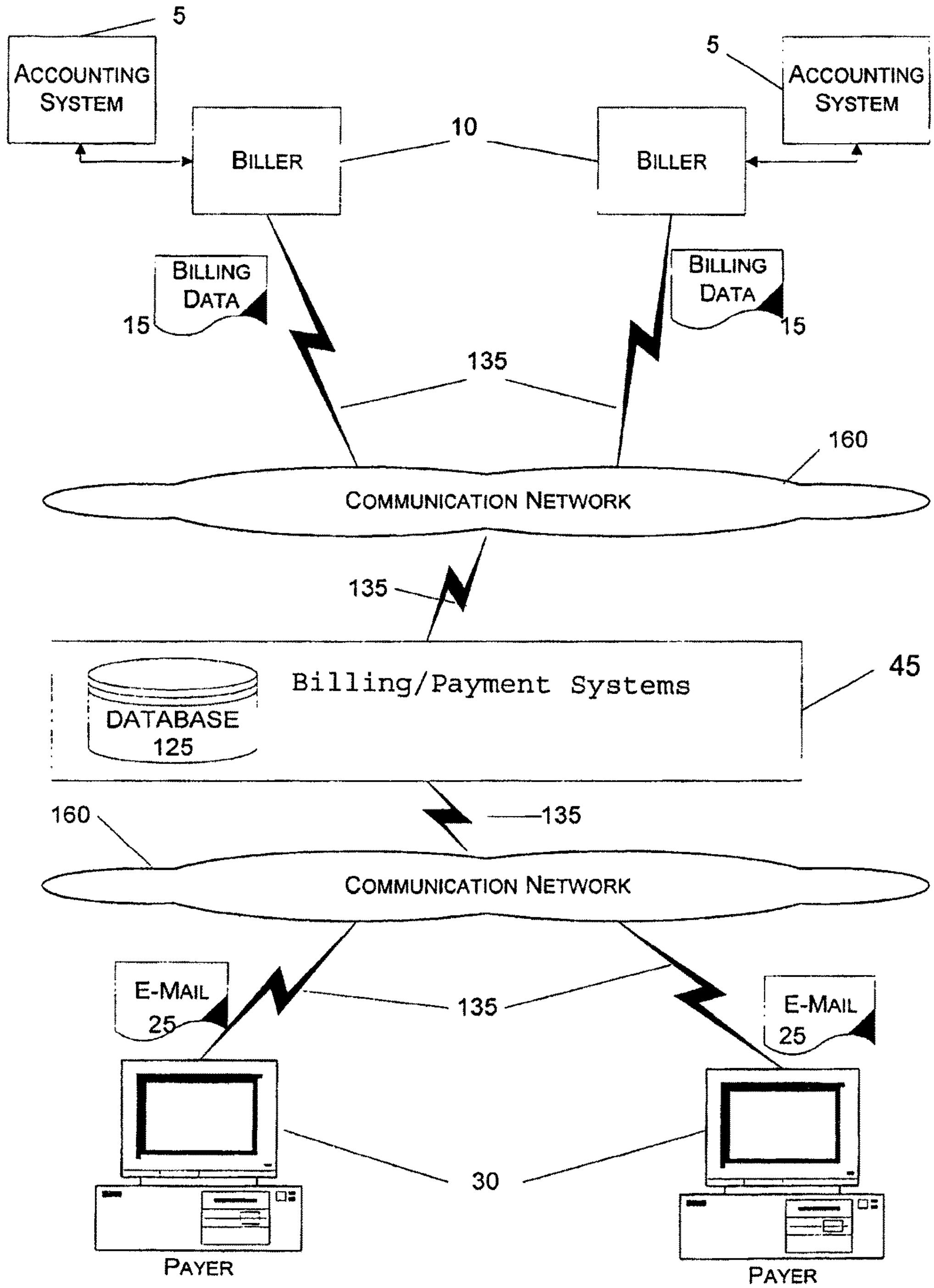
FIG. 2 is a block diagram illustrating an electronic billing transaction flow that may be incorporated in embodiments of the invention.

FIG. 2 is a block diagram illustrating an electronic billing transaction flow that may be incorporated in embodiments of the invention. Billing information may be transmitted from the biller 10 to the billing/payment systems 45 to notify the payer 30 of the upcoming bill. The billing/payment systems 45 may be one system or multiple systems and may or may not be or include the host system shown in FIG. 1. Regardless of the entity requesting and receiving bill payment, the host system 50 shown in FIG. 1 may manage cash flow with respect to the bill as will be further described herein. Billing information may be sent as bulk billing data 15 originating from the biller's accounting system 5. The billing/payment systems 45 may format the data 15 for all participating payers 30 of the biller 10 in order to generate a billing summary. In embodiments of the invention, the billing/payment systems 45 of FIG. 2 may be incorporated in the host system 50 or alternatively may be one or more separate, discrete, or unaffiliated systems. Alternatively, the biller system 10 can generate this summary information prior to communicating with the billing/payment systems 45. The billing/payment systems 45 may incorporate this summary information into an email 25 and send the email 25 to the payer systems 30 with notification of the bill originating from the biller system 10. The email notification 25 may also include a URL that can be used by the payer system 30 to connect to a website, generally hosted by service provider billing/payment systems 45, which may or may not include the host system, or the biller, to view full billing information.

As previously discussed, the email 25 may contain a summary of the bill that is detailed enough from the payer 30 to manually pay the bill using a traditional non-electronic form of payment such as by check, cash, money order or other non-electronic methods. A payer 30 using this option may be automatically notified when a bill is due, but retains the ability to pay the bill using traditional methods. Thus, the payer 30 receives the email 25 and then decides whether to pay the bill electronically or by more traditional methods. If the payer 30 decides not to pay the bill electronically, the payer system 30 may print the email and forward cash, check or money order in non-electronic form with the printed email serving as a remittance form ensuring proper crediting of the payer's account.

If the payer 30 decides to pay the bill electronically, the payer may be directed via the embedded URL to the biller's website or service provider website. In the case where the biller is hosting the service, the payer 30 is directed to the biller's website. Otherwise the payer may be directed to the service provider's website for payment. The service provider may be, for example, a financial institution including the host system or a third party aggregator. Instead of paying the bill electronically, the payer may alternatively print the bill using a payer system or device. The printed bill may contain machine recognizable information for matching with the biller's invoice. Thus, the printed bill can be matched with the invoice upon submission to a teller, an ATM, or upon mailing to a branch or central banking location. The printed bill could be scanned and the matching of the bill with the invoice can be accomplished automatically through banking system software and hardware.

Additionally or alternatively to the delivery of bills through email, the host system may communicate through push notifications that may be conveyed through mobile or desktop applications and/or SMS notifications. Furthermore, in addition to providing a link to view bill details, the email, text, or other form of push notification may allow the bill to be paid without requiring login credentials or other actions from the payer. The push notification may allow the bill to be paid with one click or tap on the notification or in the case of SMS messages, with a return text. The return text message may, for example, simply convey the message "PAY" or an alternative message.

Figure 3A:
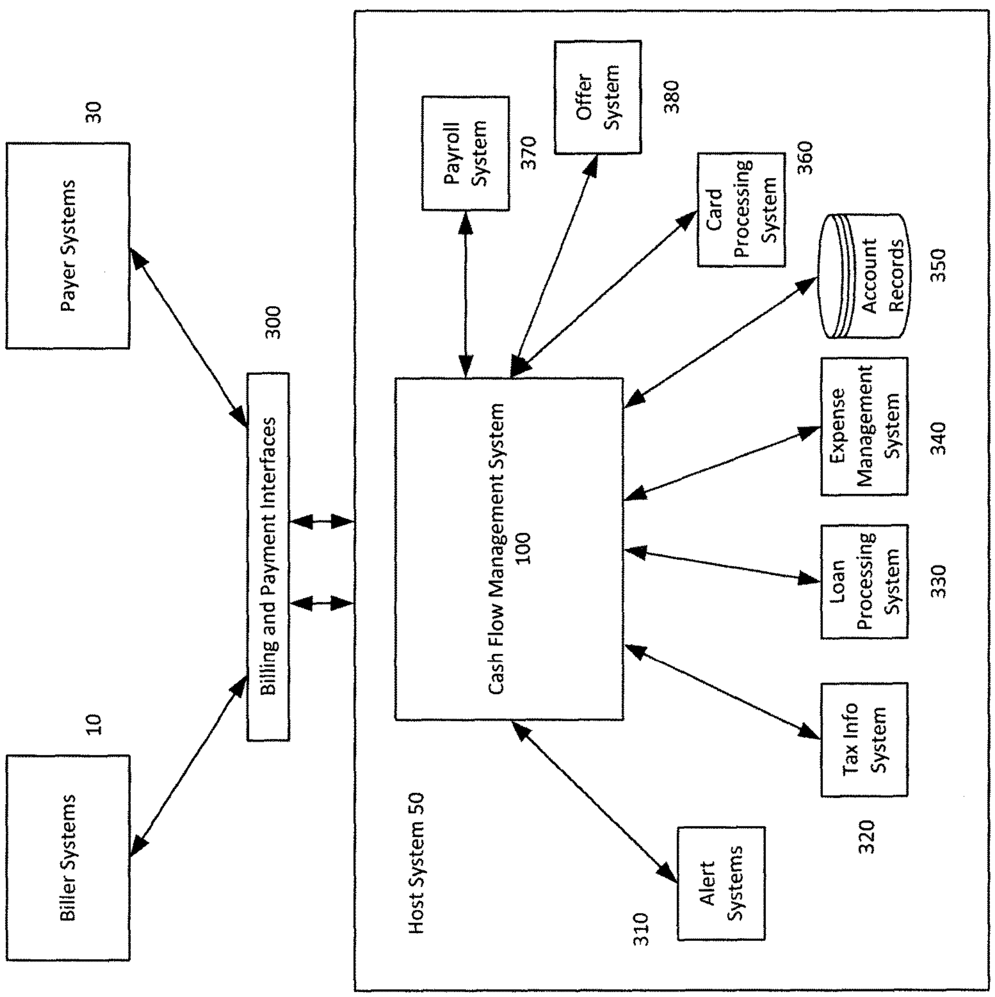
FIG. 3A is a block diagram illustrating interaction between a host system and biller and payer systems in accordance with embodiments of the invention.

FIG. 3A is a block diagram illustrating interaction between the host system 50, the biller systems 10, and the payer systems 30 in accordance with embodiments of the invention. The host system 50 may accept payments from the payer systems 30, but may also interact with other billing and payment interfaces, such as payment service providers and systems in order to collect payment information. The host system 50 may include the cash flow management system 100, which interacts with other components of the host system 50 as well as software applications, such as accounting applications that may be accessed, either within the host system 50 or externally, by the biller systems 10 and the payer systems 30. As illustrated, the host system 50 may host multiple financial solutions, such as alert systems 310, tax system 320, loan processing system 330, expense management system 340, card processing system 360, payroll system 370, and offer system 380. Other systems may also be included. The host system 50 also houses or accesses account records 350 and additional data relevant to billers and payers.

The alert systems 310 may be connected with customer accounts within the financial institution host in order to generate alerts regarding credit card charges, account balances, or account activity generally. Events generating alerts may be defined by the host system 50 or by account holders, who may be billers and/or payers. Alert systems 310 may be configured to generate alerts to payers whenever a bill is received and whenever a bill is due. For billers, the alert systems 310 may be configured to generate an alert for any payment received, when a specific bill is paid, or whenever a specific payer sends a payment.

The tax information system 320 may be available to provide billers and payers with information regarding collected taxes or paid taxes. For example, the tax information system 320 may record the portion of receivables attributed to tax for a biller and make recommendations to reserve the money for taxes or may in some embodiments arrange for the tax to be paid directly. In embodiments of the invention, the cash flow management system 100 may operate in cooperation with the tax information system to track the tax portion for the business customer, arrange for extended storage of tax-related documents, and create buckets to hold tax collected in a different bucket than revenue. In embodiments of the invention, tax collected would not be available to business customers for uses other than tax payment unless they manage their controls to make the funds available. Furthermore, the cash flow management system 100 may allow businesses to control access to tax information such that financial professionals, such as CPAs, can access the business's tax information online.

The loan processing system 330 may receive and process loan applications and may further generate loan information for offers or in response to inquiries. The loan processing system 330 may also process loan payments and generate statements. In embodiments of the invention, and as will be further described below, the cash flow management system 100 may operate in cooperation with the loan processing system 330 in order to create a short term lending product based on known receivables. The cash flow management system 100 may display an offer for the short term lending product when analysis of business receivables indicate that the product is appropriate.

The expense management system 340 may be or include a system similar to that described in U.S. Pat. No. 7,949,579, which has been incorporated by reference. The expense management system 340 may be substantially as described in U.S. Pat. No. 7,949,579 and may be implemented in combination with embodiments of the invention. The expense management system 340 allows customers to view captured data and allocate transactions or percentages of transactions to user-defined categories. The expense management system 340 receives images of receipts from purchasers or receives data from merchants detailing line item data from purchases. Once this information is in the expense management system, the system allows users to categorize the information by project or to otherwise manipulate the information to manage expenses in any convenient manner. In cooperation with the expense management system 340, embodiments of the invention enable the linking or expenses to new or existing invoices. This feature may be particularly useful when billers are working on a time and materials basis and are able to tie materials and related expenditures to a particular bill that will be transmitted to a payer.

The card processing system 360 may include a system such as those known in the art for monitoring and processing payment card transactions. Payment cards may include, for example, credit cards, debit cards, smart cards, prepaid cards, etc. The card processing system 360 may communicate with other disclosed systems such as the alerts system 310 in order to generate alerts and notifications regarding card activity. In embodiments of the invention, the card processing system 360 may include functionality may have the capability to process card transactions on behalf of clients as a single submitter and the financial institution could manage settlement back to the customers separately from the normal card settlement process. This functionality would enable payment cards to be presented to the system for payment of invoices even if the customer does not have a card processing relationship.

The payroll system 370 may track payroll information for businesses and may also interact with the other disclosed systems. For example, the cash flow management system 100 may monitor the payroll system 360 and if it finds that a business will have difficulty making payroll, it may recommend a loan based on loan information available from the loan processing system 330. The payroll system 370 may also feed into the invoicing process. For example, if an employee or contractor is being paid for hours related to a particular job, those hours can be related to an appropriate invoice to support billing for time worked and recorded.

The offer system 380 may be a system that develops and presents customized offers for banking customers. The offers may include financial products tailored to the customer based on customer behaviors. For example, based on the customer's banking history, the offer system 380 may determine that the customer needs a line of credit or that the customer might be interested in various investment products. The offering of financial products is merely an example, as non-financial products may also be offered. In embodiments that will be further described herein, the offer system 380 may operate to generate offers for use in conjunction with electronic bills.

The account records 350 may be contained in a hardware storage area and may include records of customer accounts with the host system 50. The customer accounts may include both biller and payer accounts and may include various types of accounts including checking, savings, investment, mortgage, other types of loan, credit accounts, etc. The account records 350 may be used in cooperation with embodiments of the invention in order to associate card expenditures or DDA account expenditures to an invoice billing the cost of materials to a customer. Furthermore, deposits to accounts may be associated with invoices generated through the system.

Figure 3B:
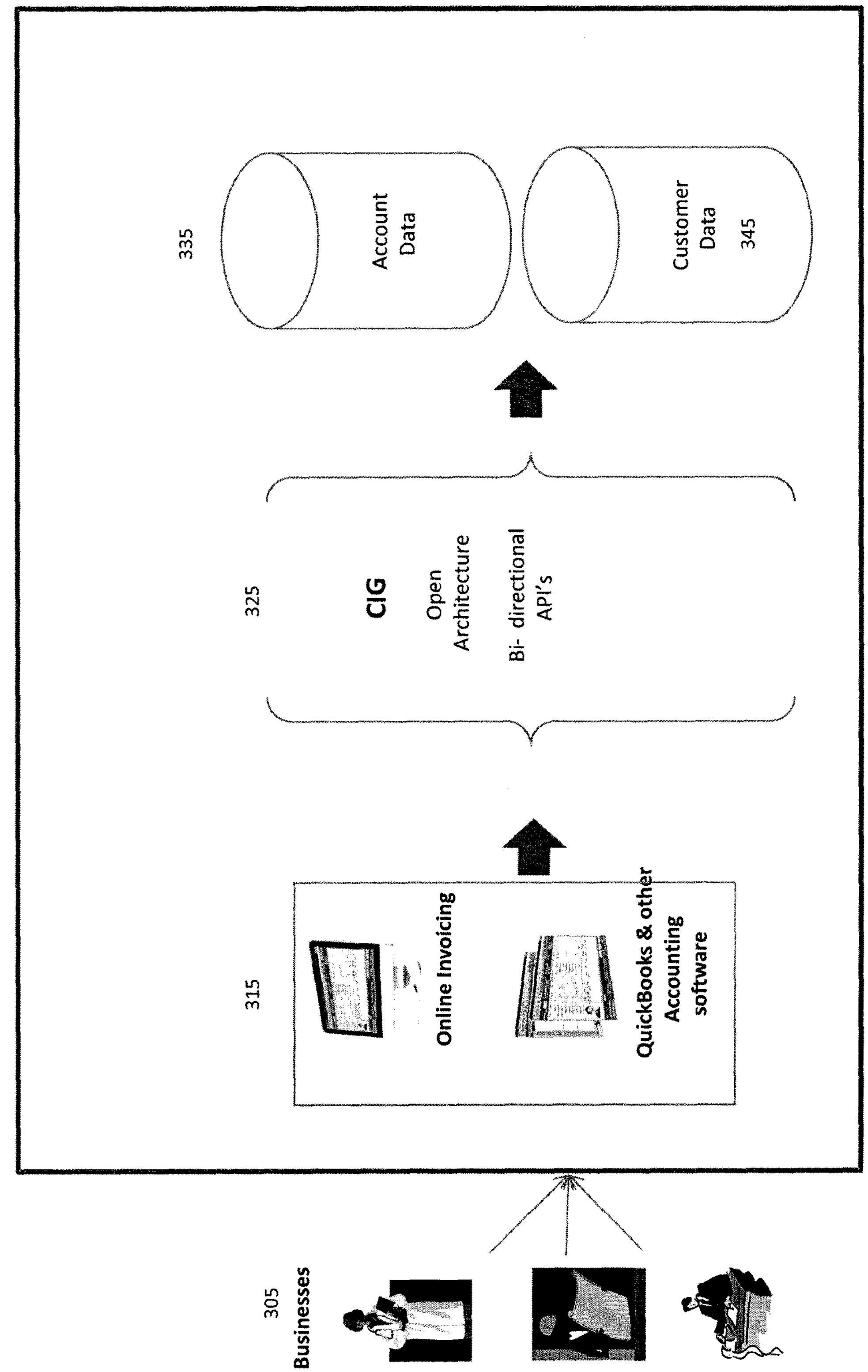
FIG. 3B is a flow chart illustrating business interaction with host system.
Figure 4:
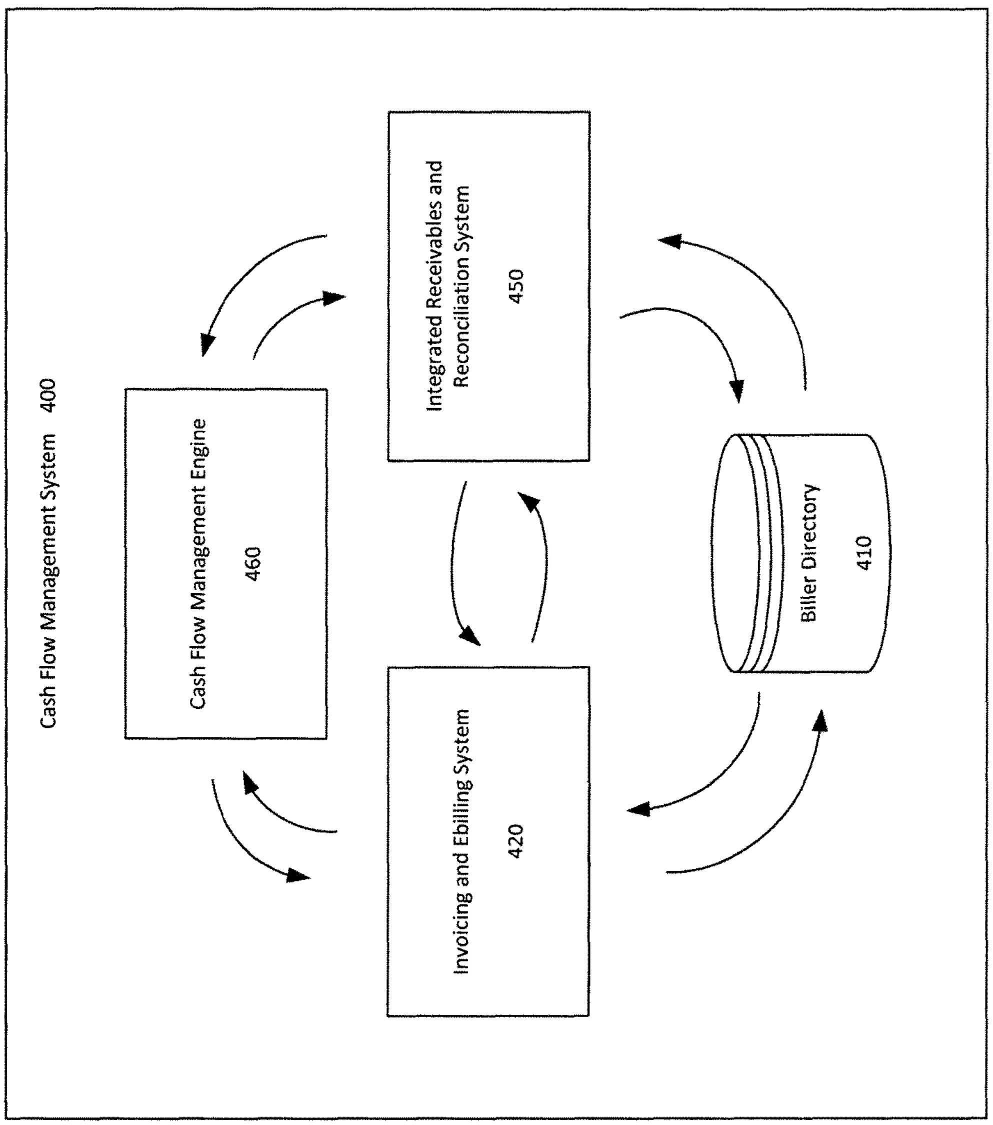
FIG. 4 is a block diagram illustrating interaction between components of the cash flow management system in accordance with an embodiment of the invention.

FIG. 3B is a block diagram illustrating interaction between a host system 325 and biller systems in accordance with embodiments of the invention. Businesses 305 may implement biller systems 315 to generate invoices and may use Quickbooks™ or other accounting software to track the invoice. The host system 325 may include a cash flow management system as further described herein that utilizes an open architecture with bi-directional application program interfaces (APIs) to leverage account data 335 and customer data 345 to update the biller's accounting software, which may be located externally to the host system. Open architecture facilitates the processes of adding, upgrading, or swapping components FIG. 4 is a block diagram illustrating interaction between components of a cash flow management system 400 in accordance with an embodiment of the invention. A biller directory 410 may store biller information and may be available to other components of the cash flow management system 410 as well as to payer and biller systems. The biller directory 410 may include an inventory of billers. The presence of the billers in the directory enables the billers to be paid through a managed payment delivery mechanism, which may include, for example, an internal settlement process, electronic funds transfer through ACH, or use of check bundling to expedite mail delivery. Payers create payees, which when created, are matched to entries in the biller directory that identify options for making payments, such as the amount of time required to deliver the payments and the payment methods supported. The payment methods may include, for example, internal DDA, external DDA, credit card, etc. Through the use of the biller directory, paying customers can view their payments by payee. The biller directory may also be published to third party payment service providers and billing service providers so that payers can view these options when interacting with payment systems not associated with the host system. In embodiments of the invention, the biller directory creates a history of payments associated by biller rather than payment. Accordingly, regardless of payment type, a paying customer can view payments by biller. An invoicing and electronic billing system 320 accesses and updates the biller directory 410. An integrated receivables management and reconciliation system 450 tracks receivables and matches them with invoices generated by the invoicing and electronic billing system in a manner to be more fully described below. A cash flow management engine 460 utilizes the information generated by the invoicing and electronic billing system 420 and integrated receivables and reconciliation system 450 to update accounting systems utilized by the billers to keep the billers informed of their cash flow situations in real time via various user interfaces including a dashboard to provide information and allow interaction. Additionally, the cash flow management engine 460 interacts with other systems within the host system to gather data pertinent to the billers and to provide a user interface to help billers visualize their individual cash flow situations.

Figure 5:
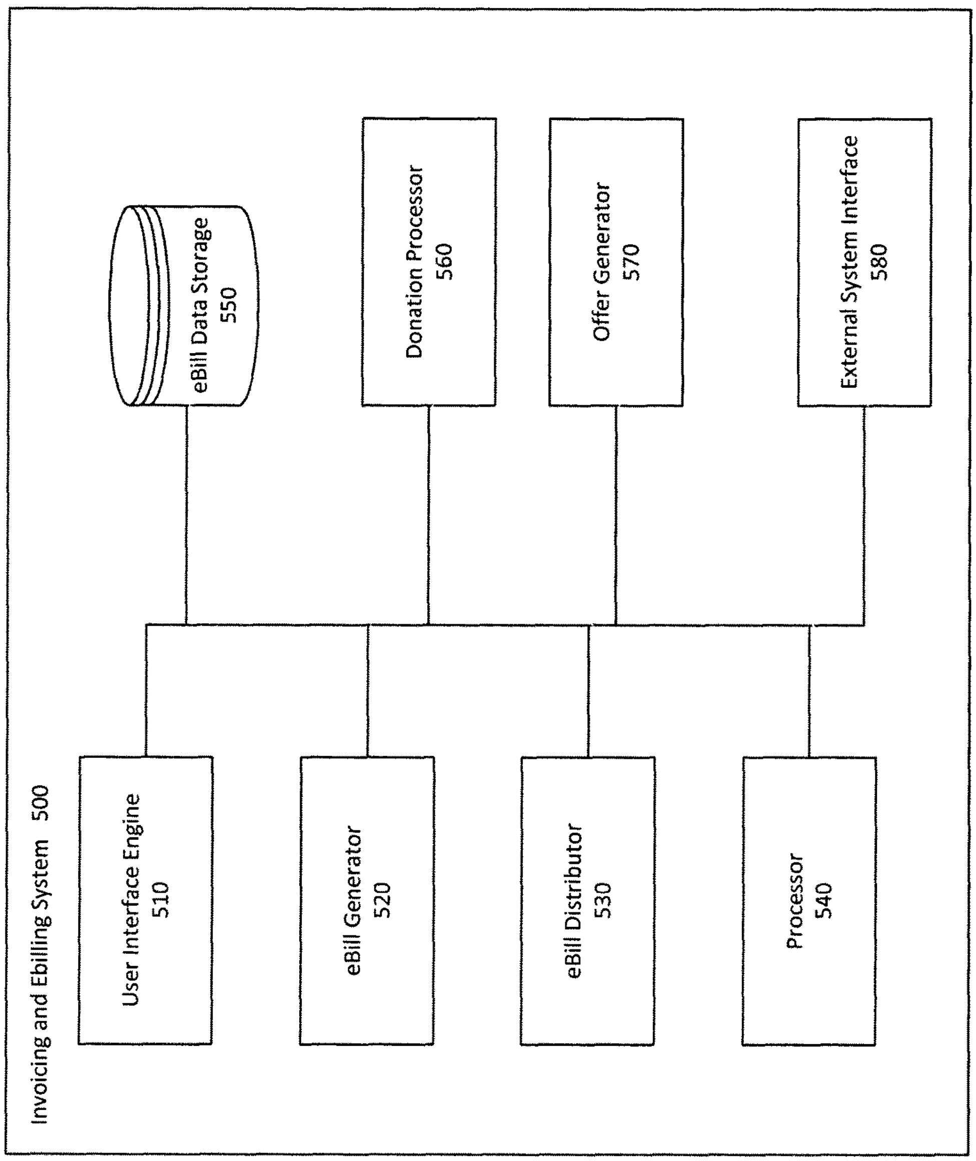
FIG. 5 is a block diagram illustrating features of an invoicing and electronic billing system in accordance with an embodiment of the invention.

FIG. 5 is a block diagram illustrating features of an invoicing and electronic billing system 500 in accordance with an embodiment of the invention. The system may include a user interface engine 510, an electronic bill generator 520, an electronic bill distributor 530, a processor 540, electronic bill data storage 550, donation processor 560, offer generator 570, and external system interface 580.

The user interface engine 510 may be utilized to generate convenient user interfaces for payers and billers. In embodiments of the invention, a user interface is generated allowing for payments to clients from payers who are not customers of the host system. In particular, the system allows billers to add customization to a UI so that payers, when responding to a bill, may be directed to a site that uses the biller's branding to present payment options and functionality. The host system may provide functionality in the form of a white label payments page for the biller to specify customized domains, upload logos or other graphics to display on the page, and allow for customized content or messaging. Thus, when payers access the site using a link from the biller's web site or a link provided in a push notification or other location, the payers will view the customized information and payment options. User interfaces for payers and billers will be further described below.

The electronic bill generator 520 may be responsive to invoice creation by a biller system in order to generate an electronic bill that contains a unique identifier. The unique identifier may later be matched with receivables as will be further described below in order to update the biller accounting system as well as any other integrated systems. The identifier may be uniquely created as a combination of alphanumeric characters, or it may utilize pre-existing billing information in unique combinations, such as name, birthdate, email address, mobile phone number and bill amount. As will be further described herein, the electronic bill may be paid through numerous sources and channels. For example, the payer may print the electronic bill and send it back to the biller through US mail with a check. Alternatively, the payer may pay the electronic bill through a payment service provider. The payment service provider may be integrated with the host system or may alternatively be a third party aggregator.

The electronic bill distributor 530 may distribute the electronic bills via email, website, push notification, or other method, including manual methods such as mailing, to payer systems. The electronic bill distributor may also distribute the electronic bill to payment service providers that will then distribute the electronic bill to the payers, so that the payers can pay the electronic bill through the payment service providers.

The processor 540 is a computer processor capable of accessing stored data and instructions to perform various steps and may operate in conjunction with software modules described herein in order to perform various functions. Many processors may be suitable and will be further described below. All of the described engines, generators, and other components in FIG. 5 may be or include software modules that are executed by the processor 540 to perform their stated functions. Although the software modules are shown as discrete components, they may be integrated in various ways in accordance with embodiments of the invention.

The data storage area 550 may include one or more databases stored in any convenient type of storage device. The data storage area 550 may include any hardware device suitable for storing the data and may further implement database tools for management of the data, such as for example, invoice identifiers and biller and payer history information.

A donation processor 560 may be provided to allow billers to solicit donations for charities on electronic bills. The donation processor 560 may, for example, offer billers the option to provide an interface on the electronic bill for soliciting donations for charities. The charities may be selected by the biller or may be selectable by payers. The electronic bill may, for example, ask the payer if he wants to "round up" to donate the balance of the dollar to a particular charity. The donation processor would then re-direct the donation upon reconciliation. In embodiments of the invention, the donation processor 560 may direct the donations directly to the account of the charity. The donation processor 560 may also track and record monetary and other types of contributions.

An offer generator 570 may be provided to generate targeted offers to payers. In embodiments of the invention, the biller inserts a targeted offer to give the payer discounts on future purchases. The biller may be provided with the capability to define offers, which could include other incentives or discounts. The biller may apply the offer to the current bill. For example, the offer may be based on payment of the bill within a certain number of days. If the bill is paid within ten days, the payer may receive a rebate or a discount on the current or future bill. The offer may be targeted based on past behavior by the payer, which is analyzed by logic provided by the offer generator 570. The offer generator 570 may obtain the data from multiple sources, such as, for example, the expense management system, which stores line item data from purchases. The offer generator 570 may provide for tracking of offers and response rates enabling the biller to monitor user behavior. Thus, the biller can view how many users received the offer and how many acted upon the offer. The offer generator 570 may further provide for automated fulfillment support. For example, the offer generator 570 may provide data to the biller pertaining to responders and may automatically apply a received discount to a subsequent invoice. In alternative embodiments, the biller may choose to forgo generation of offers. In this instance, the host system may implement the offer generator 570 to generate offers for the payer. The offer generator 570 may for example, generate offers for financial products such as loans, credit cards, or investment accounts. Other offers for non-financial products may also be generated. As a further alternative, the host system may sell the advertising space to other billers so that an unrelated biller may generate offers using the offer generator 570 to target payers who may not already be customers. In embodiments of the invention, customers can choose to associate or link offers with a particular payment mechanism, such as a particular payment card. Thus, when customers accept an offer, through this linkage, the offer may automatically be applied.

The external system interface 580 is provided for communication with systems outside of the electronic billing system, such as those system within the host system shown in FIG. 3A or other external systems, such as payment service provider systems, biller systems, and payer systems.

Figure 6:
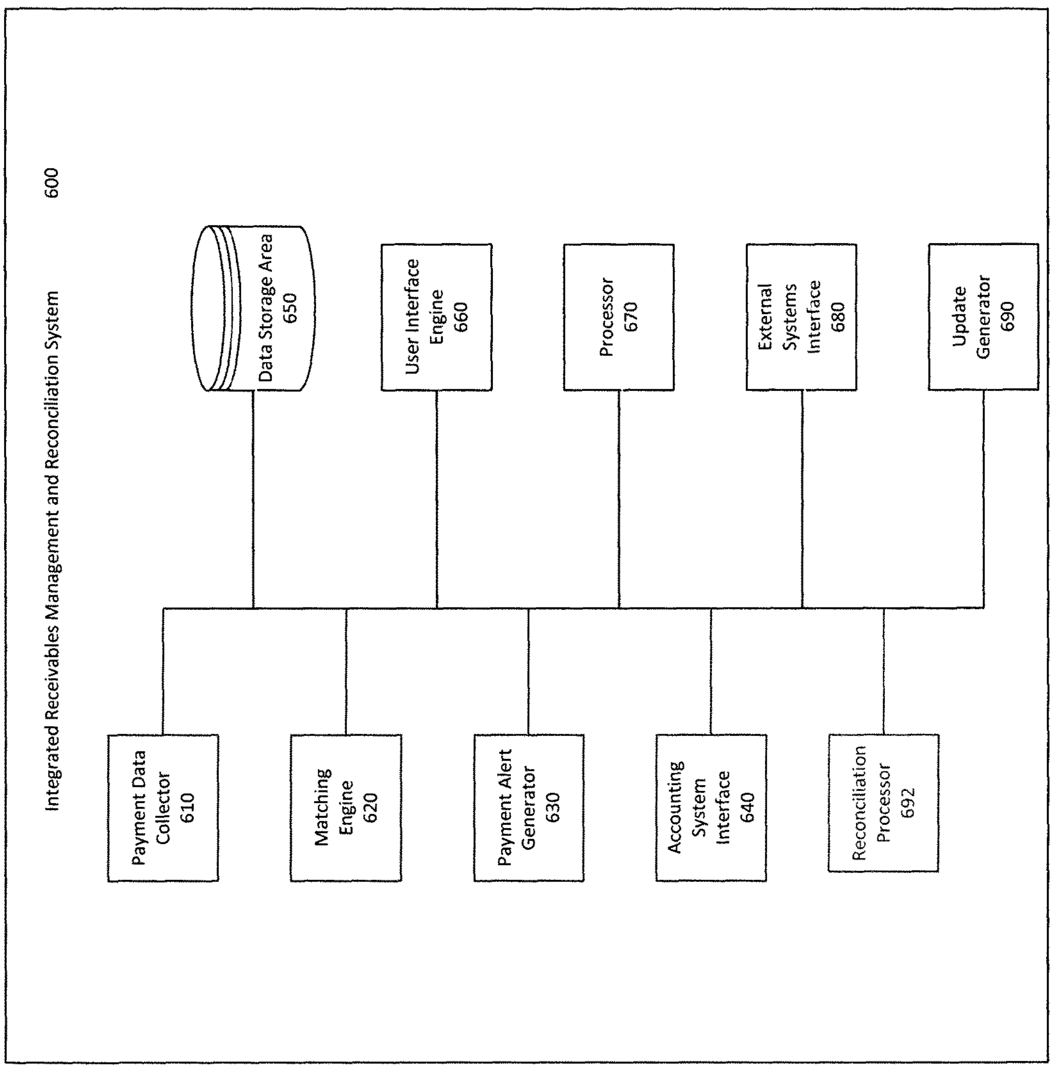
FIG. 6 is a block diagram illustrating an integrated receivables management and reconciliation system in accordance with an embodiment of the invention.

FIG. 6 is a block diagram illustrating an integrated receivables management and reconciliation system 600 in accordance with an embodiment of the invention. The system 600 may include a payment data collector 610, a matching engine 620, a payment alert generator 630, an accounting system interface 640, a data storage area 650, a user interface engine 660, a processor 670, an external systems interface 680, an update generator 690, and a reconciliation processor 692.

The payment data collector 610 may interface with account processing systems and payment service providers to collect information related to payments made on invoices generated through the electronic billing system.

The matching engine 620 may be utilized to match received payments to generated electronic bills. In embodiments of the invention, the matching is accomplished by matching the unique identifier on the electronic bill with a corresponding identifier associated with the payment. The matching process accomplished through matching engine 620 will be further described below with reference to FIGS. 10 and 11.

The payment alert generator 630 may operate upon matching of received payments with generated invoices to generate alerts for billers related to payments received. These alerts may be emails, text messages or other forms of alerts selectable by the biller.

The accounting system interface 640 may operate to update the accounting system, regardless of its location, upon matching a received payment with an electronic bill. While the accounting system may be located within the host system accessible over the Internet, it may also be located externally and accessible over the internet by both the cash flow management system and the billers.

The data storage area 650 may include a computer memory storing data, for example in one or more databases. The data may be used by any or all of the components of the integrated receivables management and reconciliation system 600 described herein.

The user interface engine 660 may be utilized to generate convenient user interfaces for payers and billers. User interfaces for payers will be further described below with reference to FIGS. 15-17. User interfaces for billers will be further described below with reference to FIGS. 18-28.

The processor 670 is a computer processor capable of accessing stored data and instructions to perform various steps and may operate in conjunction with software modules described herein in order to perform various functions. Many processors may be suitable and will be further described below.

The external systems interface 680 is provided for communication with systems outside of the integrated receivables and reconciliation system, such as those systems within the host system shown in FIG. 3A or other external systems, such as payment service provider systems, biller systems, and payer systems.

The update generator 690 may operate to generate updates for stored records, account records, or external systems based on payments received and reconciled. The engines and various other components described above may include software components including instructions executed by a programmed processor to perform the functions described. The engines may include or access databases stored in computer memory to obtain data necessary for execution of instructions. Databases may be provided and accessed both within financial services computing systems and outside of the financial services organization.

The reconciliation processor 692 may provide the capability to for payers to enter information related to disputed charges. These disputes may relate to an entire bill or to specific line items contained within a bill. In embodiments of the invention, the reconciliation processor 692 passes the inquiries to the biller to review during reconciliation so that the biller can take one or more actions related to the payer inquiry. For example, the biller might amend the bill, append additional information to the bill, or adjust the billing amount. In embodiments of the invention, the reconciliation processor may monitor the inquiries in order to manage billers with high inquiry rates to determine if poor practices or potential for fraud may warrant further action such as suspension or elimination of service. Payers may also use the reconciliation processor 692 to rescind a payment. In embodiments of the invention, payments may pend for a period of time prior to processing. Processing may occur at a specific time or within a predetermined time frame after payment submission. For example, payments may pend until the end of the business day and payers may rescind payments made prior to that time.

In addition to handling of disputes, the reconciliation processor 692 may be used to reconcile account changes. For example, when a credit card expires and a new card is issued, the reconciliation processor 692 may alter payment settings to ensure that the new card information is utilized for the payer. Typically, bank cards are associated with identifiers and the identifier does not change when a new card is issued. Therefore, the reconciliation processor 692 is able to associate the new card with the expired card through the identifier. Furthermore, the system may provide user interfaces to allow setting of default funding sources, which may be changed periodically.

All of the components shown in FIGS. 1-6 above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 7:
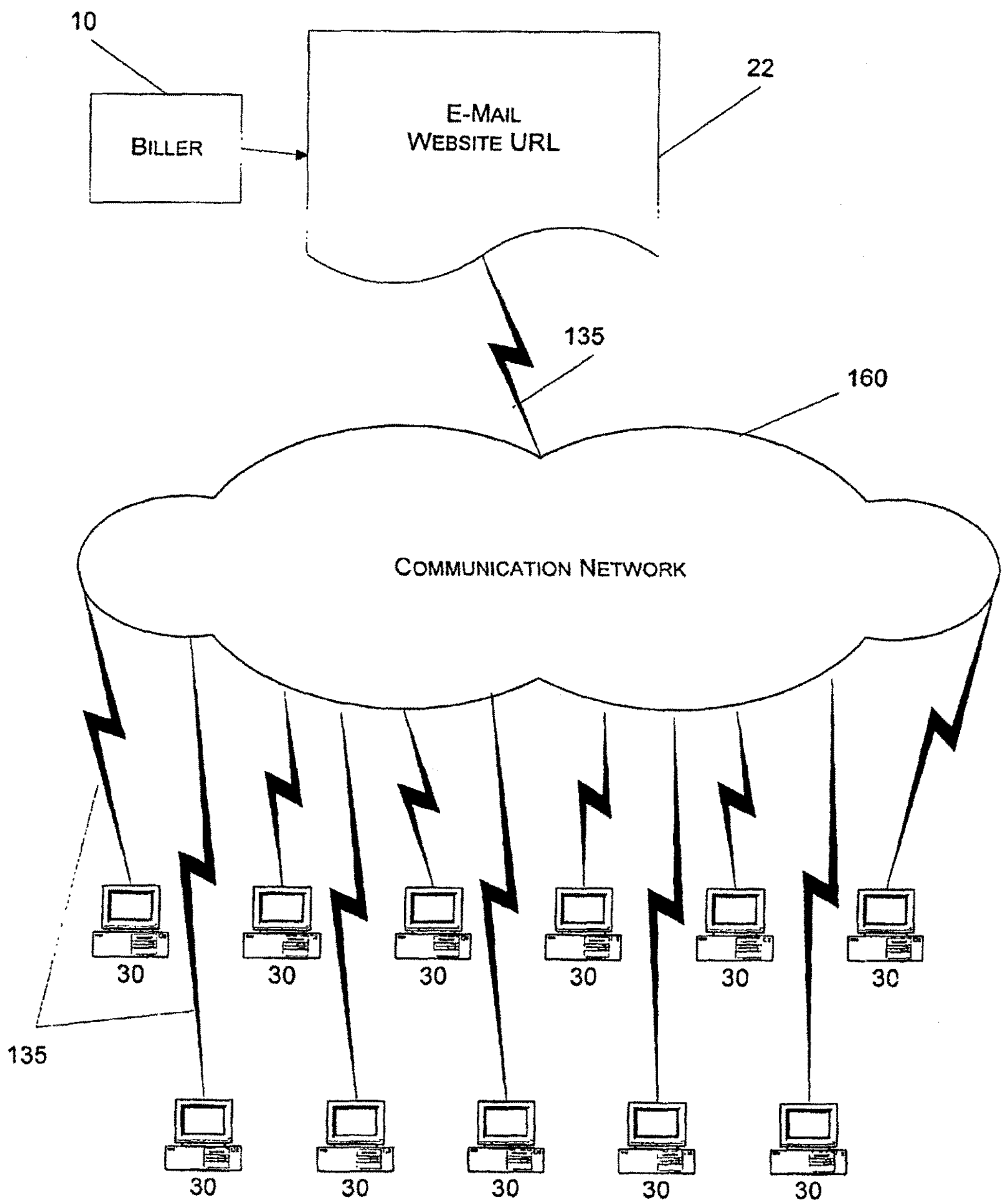
FIG. 7 is a block diagram showing communication with a biller that may be initiated in accordance with an embodiment of the invention.

FIG. 7 is a block diagram showing communication with a biller that may be initiated in accordance with an embodiment of the invention. The process displayed may be used for registering payers through payer systems 30 to sign up for electronic billing with the host system in accordance with embodiments of the invention. Billers 10 may initiate contact with payers 30 by notifying them of the option to register for electronic bill payment. Alternatively, the host system may alert the payers of the option. The notification is preferably by an email 22 which includes an embedded URL that directs the payer 30 to a website that enables the payer 30 to register for the service. Alternatively, the biller 10 can provide an insert to be included in a traditional paper based invoice mailed to the payer 30 that describes the electronic bill payment option and invites the payer to enroll. Furthermore, the host system may generate an alert to the payer when the payer visits the host system website to inform the payer that the biller can be added as an electronic biller.

Figure 8:
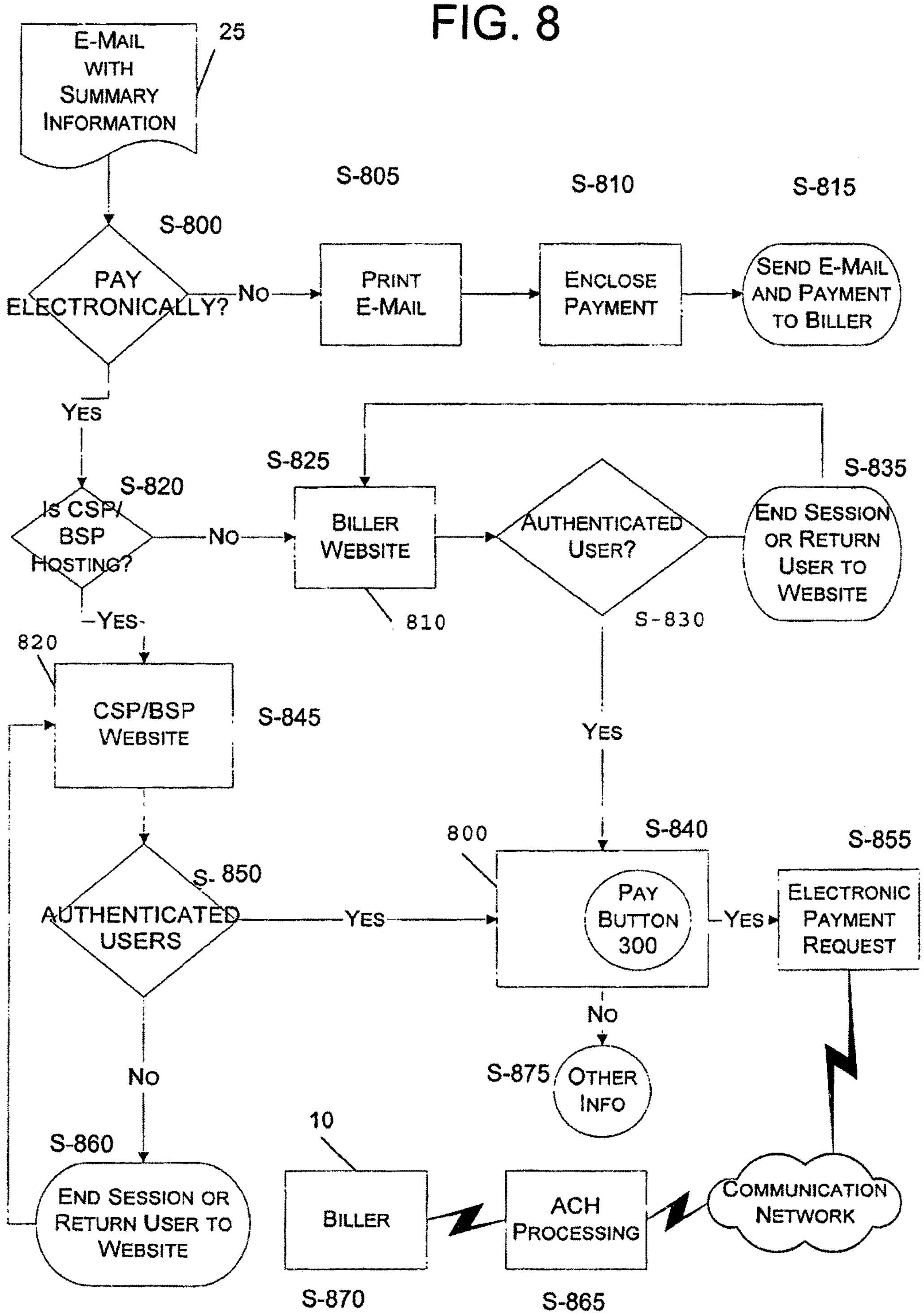
FIG. 8 is a flowchart illustrating payment options that may be associated with electronic billing in accordance with embodiments of the invention.

FIG. 8 is a flowchart illustrating payment options that may be associated with electronic billing in accordance with embodiments of the invention. The payer 30 receives the email 25 and decides whether or not to pay the bill electronically in S800. If the payer 30 decides not to pay the bill electronically, the email 25 is printed as S805. A check, cash, or money order or other non-electronic form of payment is included with the printed email 25 and sent to the biller with the printed email 25 serving as a remittance form ensuring proper crediting of the payer's account at S815.

In embodiments of the invention, if the payer decides to print the bill, the printed bill may contain encoded information to facilitate linking of the payment with the invoice. This functionality enables the printed document to be scanned at an ATM so that an associated deposit could automatically be linked by the system to the bill and be credited directly to the biller. Alternatively, the printed document can be scanned on a teller workstation or branch kiosk in order to allow the system to associate the payment with a bill and credit the payment directly to the biller. As a further alternative, the document can be scanned using a payer mobile device. The payer mobile application may automatically create a payee if one does not already exist and allow the payer to schedule payment. If the payee already exists, the mobile application facilitates linking of the payment to the payee. If a payer scans the document with a mobile device without using the mobile application, the payer may be directed to a payments page identifying the payee with biller and payment information pre-populated. The payer may be required to log in to access pre-configured funding accounts or the payer may enter funding account information.

If the payer 30 chooses to pay the bill electronically in S800, the payer is directed to either the biller's web site 810 or the payment service provider web site 820 depending upon the billing option chosen in S820. If the biller is hosting the service, the payer 30 is directed to the biller's website 810. The payer must be authenticated to ensure that the user attempting to log in is actually the payer 30 authorized to use the system. Authentication occurs using traditional security measures as known in the art in S830. If authentication fails, the session is ended or the user is returned to the billing web site to try to log in again at 835. Lock-out procedures or other security measures can be implemented if too many incorrect log-in attempts are recorded. The authenticated user is directed to a payment screen 800 hosted by the payment service provider in S840. Payer 30 may be presented with the full statement detail of the bill and with an option 300 to pay the bill electronically. Payment screen 800 may also have links to other information as shown in S875.

Once payer 30 chooses to pay the bill online by selecting the appropriate link 300, an electronic payment request S855 may be sent across the communication network for ACH processing at S865, which credits the biller's account on behalf of the payer 30 in S870. Other links may optionally be included to return the payer to the main website 810 to view advertisements or informational messages selected by the biller.

If the payment service provider is hosting the service, the payer 30 is directed to the payment service provider website 820 for authentication in S845 as above. If the payer 30 is authenticated in S850, the payer is directed to the payment screen 800 and given the option to pay electronically. As above, the payer 30 choosing to pay electronically selects the appropriate link 300 which sends an electronic payment request in S855 through a communication network to ACH processing in S865, which credits the biller's account on behalf of the payer 30 in S870.

As is known in the art, all security information as well as personal billing information may be transmitted using security encryption schemes such as secure sockets layer (SSL). Any secure username/password and/or biometric schemes may be used to verify the identity of the payer 30. An ACH instruction may be generated that debits the payer's account (e.g. Demand Deposit Account ((DDA)) and credits the biller's account. Access to the ACH may be provided by securely connecting to the ACH Network through electronic funds transfer (EFT). Alternatively, the user could make this payment via a credit card, funds transfer, or any other acceptable form of electronic payment. As explained above, the payment service provider that processes the payments from payers 30 could be a financial institution, such as the host system, with links to the ACH network. In embodiments of the invention, the financial institution may or may not be the host of the electronic billing system. However, the payment service provider may also be a non-bank establishing its own link to ACH.

As part of the ACH process, the biller is provided with remittance data concerning the transaction. If the payer is a customer of the payment service provider 20, then internal book entries may take the place of an ACH and no ACH is required to be generated.

Figure 9:
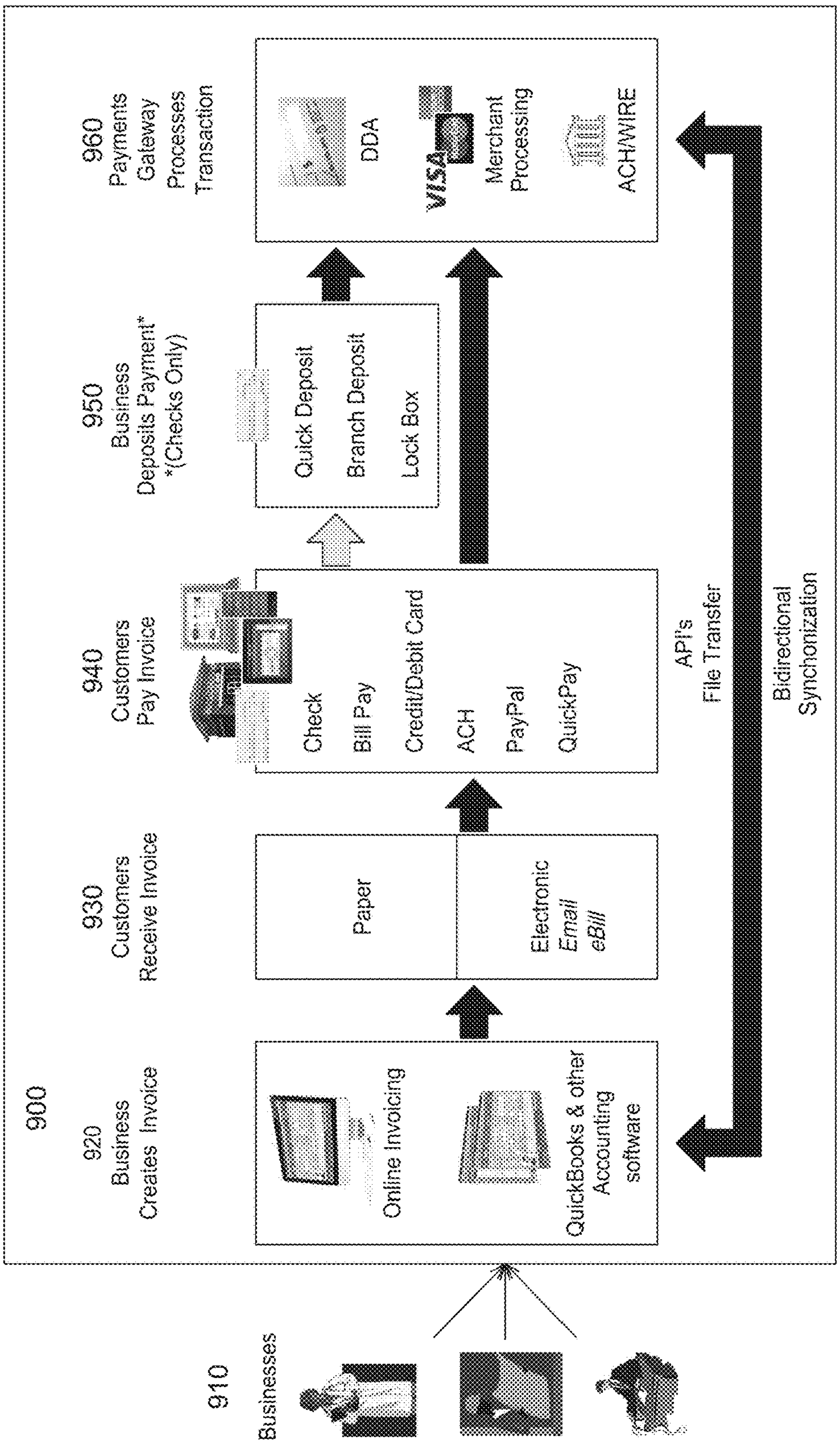
FIG. 9 is a flow chart illustrating billing and payment processes that may be incorporated in accordance with an embodiment of the invention.

FIG. 9 is a flowchart 900 illustrating billing and payment processes that may be incorporated in accordance with an embodiment of the invention. Businesses 910 create invoices at 920. The invoices may be created by online invoicing offered through the host system or by QuickBooks™ or other accounting software accessible to both the biller system and the host system. Customers receive the invoice at 930. As illustrated, the customer may receive the invoice in paper form, by electronic mail, or by ebill. Ebills may be viewed online through a mechanism offered by the host system or through a third party bill servicer. Customers then pay the invoice at 940. Payment may be accomplished through multiple funds sources such as credit cards, debit cards and bank accounts. Channels for payment may include check, online bill pay, credit card online or on paper, ACH, Paypal™, or Quickpay™. These options are not exhaustive. Other payment channels are also within the scope of the invention. In 950, if the payment was made by check (which enables the payer to electronically request a paper check), the business deposits the check. The deposit may be made, for example by quick deposit, branch deposit, or lock box. If the payment was made through bill pay, it may be settled electronically based on integration with the biller directory and publishing of that directory to third party bill payment providers. At 960, the payment is processed by deposit to DDA account. However, if the payment was made by credit, debit, ACH Paypal™, QuickPay™, or ebill, the business avoids the necessity for deposit in 950 and the process continues to payment gateways such as merchant credit card processing and ACH/wire for automatic processing. As explained above, and as will be further described below, the payment may be reconciled with the online invoice through bidirectional synchronization.

Figure 10:
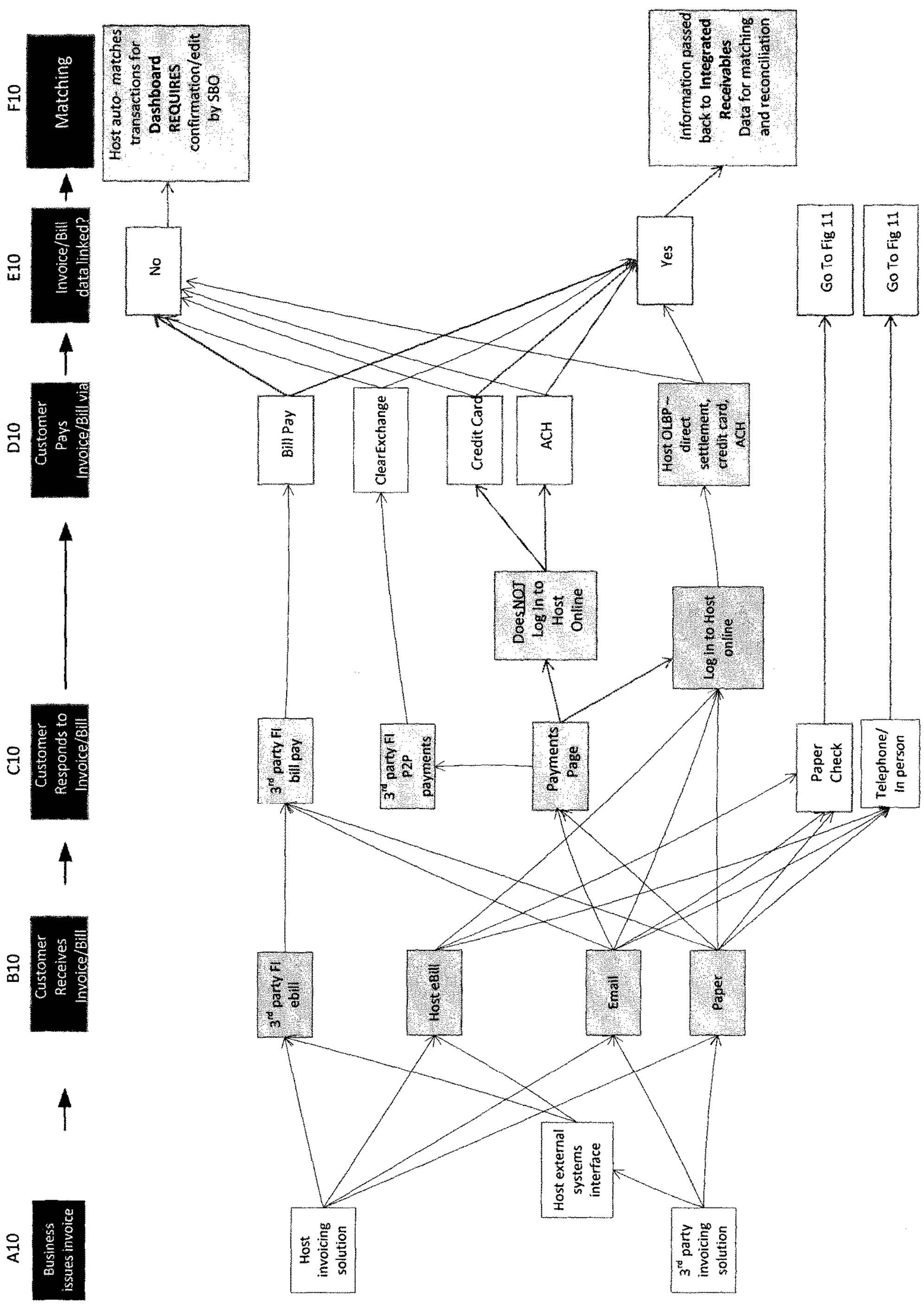
FIG. 10 is a flow chart illustrating a cash flow management method that may be implemented when customers use accounts managed by the host system to pay invoices in accordance with an embodiment of the invention.

FIG. 10 is a flow chart illustrating an integrated receivables management method for reconciling payments with invoices that may be implemented in accordance with an embodiment of the invention. The invoice may be issued through a host invoicing solution or through a third party invoicing solution. In step A10, the business issues the invoice. In step B10, the customer receives the invoice. In embodiments of the invention, the customer may receive the invoice through multiple channels, such as a third party bill presentment provider electronic bill, email, host electronic bill, and paper bill. In step C10, the customer responds to the bill. If the bill is a third party bill presentment provider electronic bill, the customer may pay the bill through the third party provider. If the bill is transmitted through email, the customer can pay through a host or other financial institution payments page linked through the email, through paper check, or by telephone. If the bill is a host system electronic bill, the customer may pay by logging into the host online, by paper check, or by telephone. If the bill is a paper bill, the payer may pay by telephone, by paper check, or by logging into the host online. These scenarios are merely exemplary and other payment scenarios are within the scope of the invention.

In step D10, the customer pays the bill through one of multiple methods. For example, if the customer accesses the host online, the customer may pay by QuickPay™ or electronic check ordering systems offered by the host. The customer may also pay by credit/debit or ACH. However, if the customer does not log onto the host online, the customer may pay by credit card or ACH. The customer may also pay through a third party payment system.

In step E10, the reconciliation system determines if the invoice and bill data are linked to the payment. The integrated receivables and reconciliation system performs a matching process based on this determination. If the invoice and receivable are already linked, the system handles reconciliation. If the invoice and receivable are not already linked, the integrated receivables and reconciliation system performs auto-matching to link the two. The invoice and receivable may already be linked by an invoice number that was generated at the time of creation of the invoice. This invoice number can function to link the payment to the receivable record. In some instances, the customer may be required to enter the invoice number upon payment. In other instances, the invoice number may be included on a printed bill that is scanned and entered into the system. In yet other instances, such as when the invoice is issued through the host system and the payer pays through the host system online, the invoice and payment may already be linked. However if they are not linked, such as when the customer does not know the invoice number or if the invoice number is not entered, the system may execute business rules to perform automatic matching of the receivable with an invoice. Auto-matching may be performed based on unique identifiers. The unique identifiers may be or include combined invoice information, such as payer name, bill amount, and bill date. The auto-matching process may attempt to match these payment parameters with an invoice also associated with these payment parameters. If the host system is required to perform auto-matching, the user interface engine of the reconciliation system may generate a dashboard showing the auto-matched payments to the biller and may require biller confirmation before updating linked systems such as the accounting system. Preferably, the dashboard will display and give the businesses the opportunity to confirm all matches. Furthermore, the dashboard should enable the business user to correct any mis-matches and manually associate unmatched payments with invoices.

Figure 11:
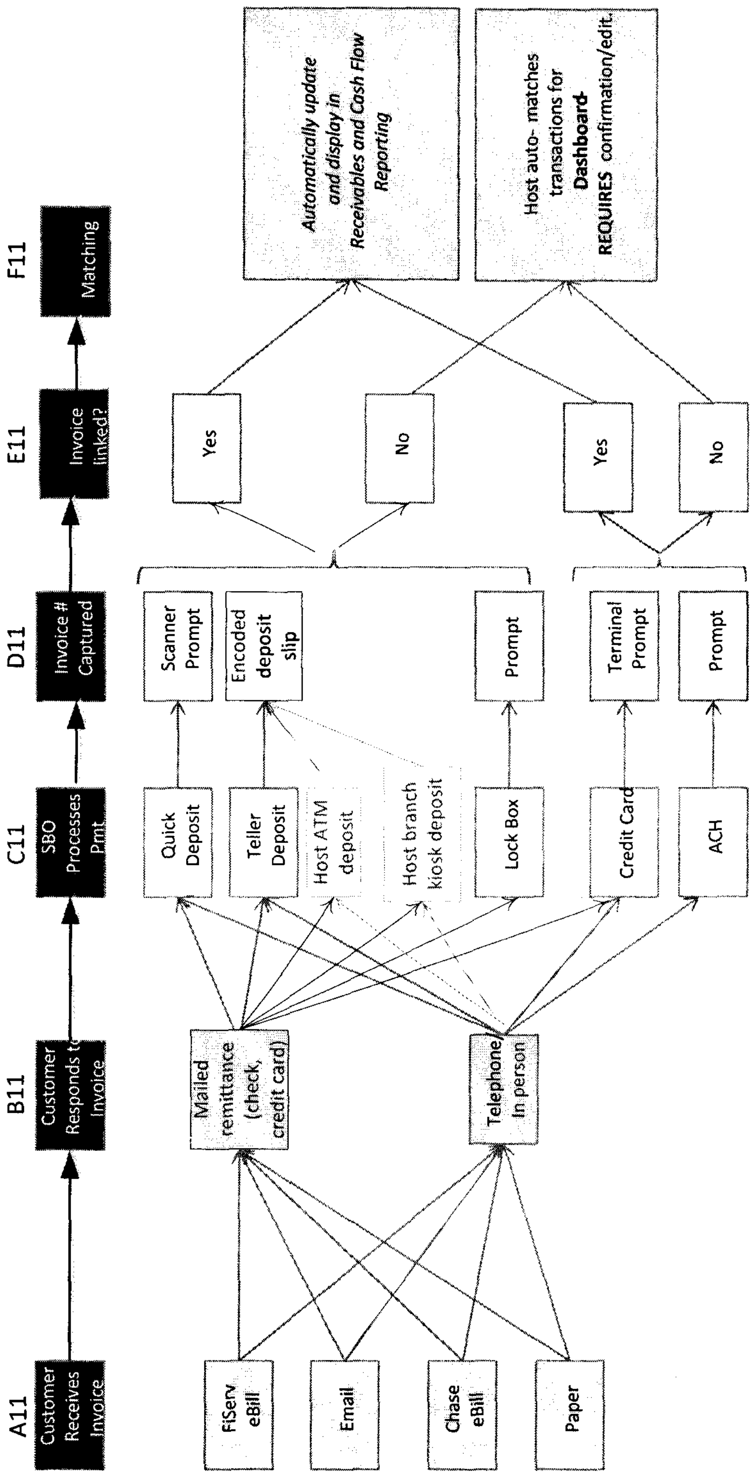
FIG. 11 is flow chart illustrating a cash flow management method that may be implemented when customers respond to received invoices with specific non-electronic payment channels in accordance with embodiments of the invention.

As shown in the lower right-hand corner of FIG. 10, if bills are paid by telephone, in person, or by cash or paper check, the system proceeds in accordance with the steps shown in FIG. 11. As shown in FIG. 11, the customer receives the invoice through one of several channels in accordance with step A11. The channels may include, for example, third party payment service provider, such as FiServ™ electronic bill electronic bill, email, host system electronic bill, or paper bill. The customer responds in step B11 with a mailed remittance such as paper check or credit card authorization or a telephone or in-person payment. When the payment is by mail, the business may process the payment in step C11 by Quick Deposit™, teller deposit, host ATM deposit, host branch or kiosk deposit, credit card, or lock box. If the payer elects payment by telephone or in person, the business may process the payment in step C11 by ACH or by credit card, Quick Deposit™, teller deposit, host ATM deposit, or host branch or kiosk deposit. In step D11, the system captures the invoice identifier. The invoice identifier can be captured in a number of ways, including, for example, by scanner or image capture. For example, with Quick Deposit, the depositor may capture an image of the invoice in addition to the check, for example, with a mobile device. If the deposit is by teller, the deposit slip may have a field requiring entry of the invoice identifier. In the case of deposit by lock box or ACH the depositor may be prompted for the invoice identifier. In the case of processing by credit card, a terminal prompt may be issued. When the biller receives a payment directly and deposits it, the biller may print a deposit slip accessed online and indicate invoices to be covered in the deposit. In this instance, the deposit slip can be scanned at the time of deposit through a teller, ATM, or branch kiosk to link each payment with the appropriate invoice or invoices and to perform automatic updates.

In step E11, the system determines if the deposit and the invoice are linked through an invoice number or other unique identifier. If they are linked, the system automatically updates and displays receivables. If they are not linked, the integrated receivables and reconciliation system performs auto-matching to link them. The auto-matching process in step F11 may include determining, upon receiving notification of the payment, whether the payment is linked to an invoice based on the invoice identifier, and performing an automatic matching process for payments not linked to an invoice based on the identifier. The automatic matching process may implement business rules to match a payment with a generated invoice. As explained above, the matching could be accomplished based on such parameters as payment date, payment amount and payer. Also, as set forth above, the user interface engine may generate a dashboard that requires biller confirmation before updates can be performed. Upon biller confirmation of the auto-match, the receivables and accounting system and other linked systems are updated. If the biller does not confirm the auto-match, the biller can reject the auto-match and perform a manual match. Alternatively, the system can note the error and perform auto-matching again until the biller confirms the match.

Figure 12:
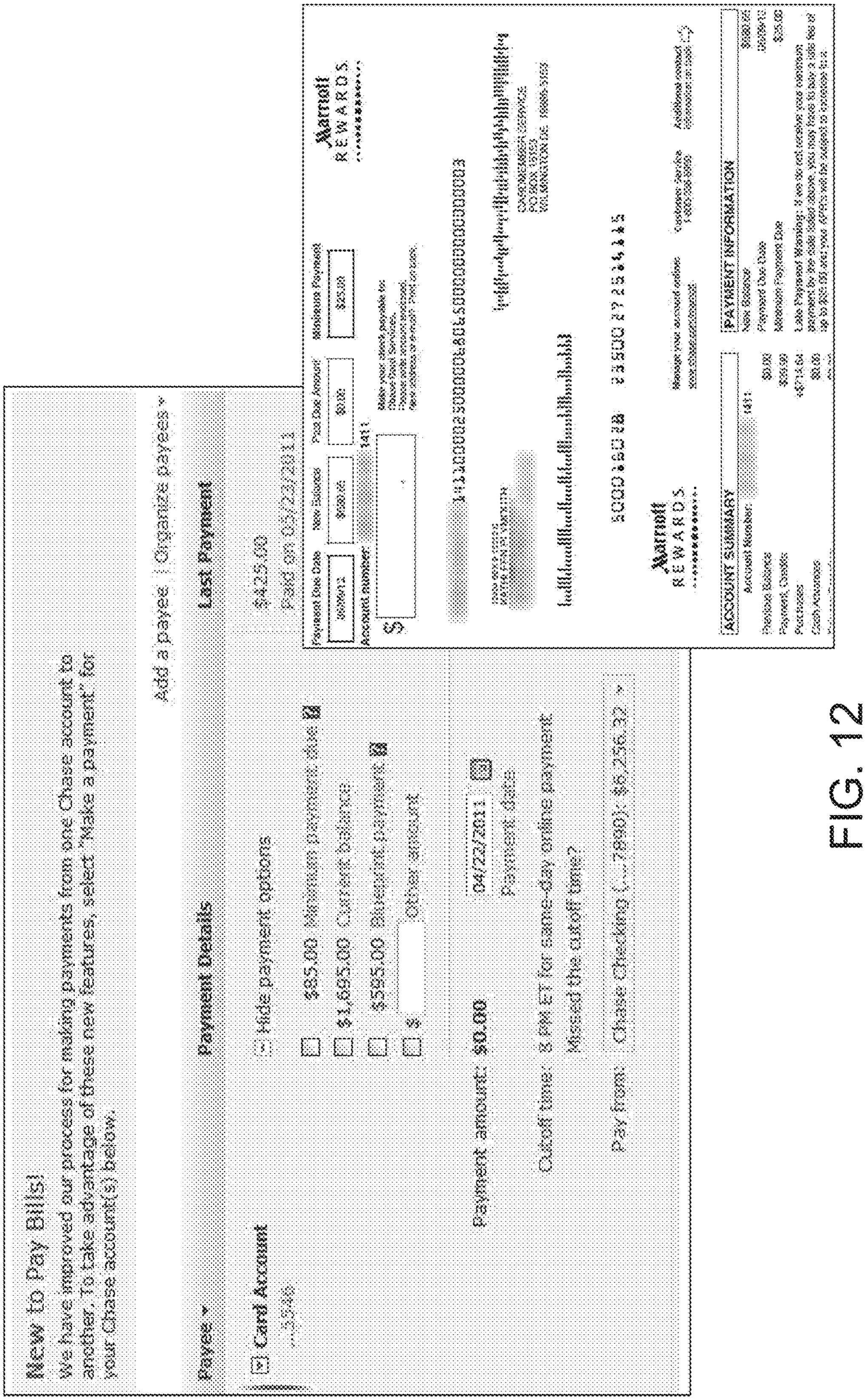
FIG. 12 is a user interface illustrating payment details generated by the host system in accordance with embodiments of the invention.

FIG. 12 is a user interface illustrating payment details that may be offered in conjunction with a bill payment page 1200 generated by the host system in accordance with embodiments of the invention. The bill payment page 1200 offers instruction to new payees to select a "make payment" option. Payers may add new payees or organize or otherwise manage payees at 1210. Options may be provided to view payees 1220, display payment details 1230 and display last payment 1240. Billing details may be displayed at 1250. Online payment parameters may be displayed at 1260. The online payment parameters 1260 may include, for example, the deadline for making online payments to have them credited prior to the due date. In embodiments of the invention, customers of the host system are not required to enroll in paperless billing in order to view these billing details. In embodiments of the invention, payments through the host bill payment system may be required to be same day payments, allowing the per the maximum amount of time to submit on time payment for the bill and providing the biller with same day, guaranteed funds for payment.

Figure 13:
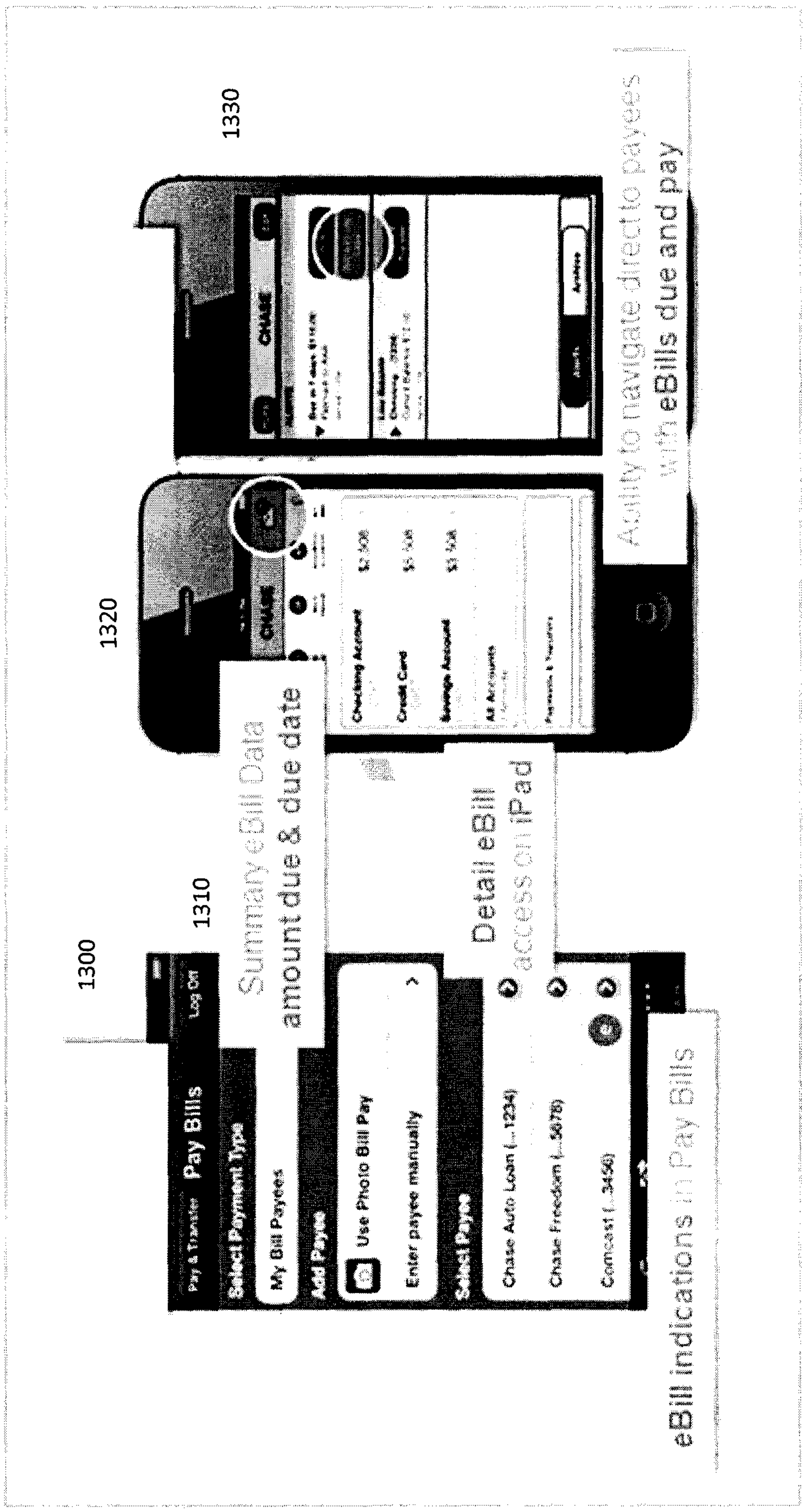
FIG. 13 is a user interface illustrating a mobile application for electronic billing information provided by the host system in accordance with embodiments of the invention.

FIG. 13 is a user interface illustrating a mobile application 1300 for electronic billing information provided by the host system in accordance with embodiments of the invention. The application 1300 is preferably available for all types of mobile devices, such as, for example, iPhone™, iPad™' or Android™. The application preferably provides summary information 1310 such as eBill data, amount due, and due date. Detailed information may be provided on tablets, such as iPad™. The level of detail provided may vary depending on the size and/or other capabilities of the mobile device. The mobile application 1300 may provide for display of all payer accounts at 1320 and may allow a user to access an inbox to view messages at 1330. The application may further allow payers with the ability to navigate directly to payees to pay bills.

Figure 14:
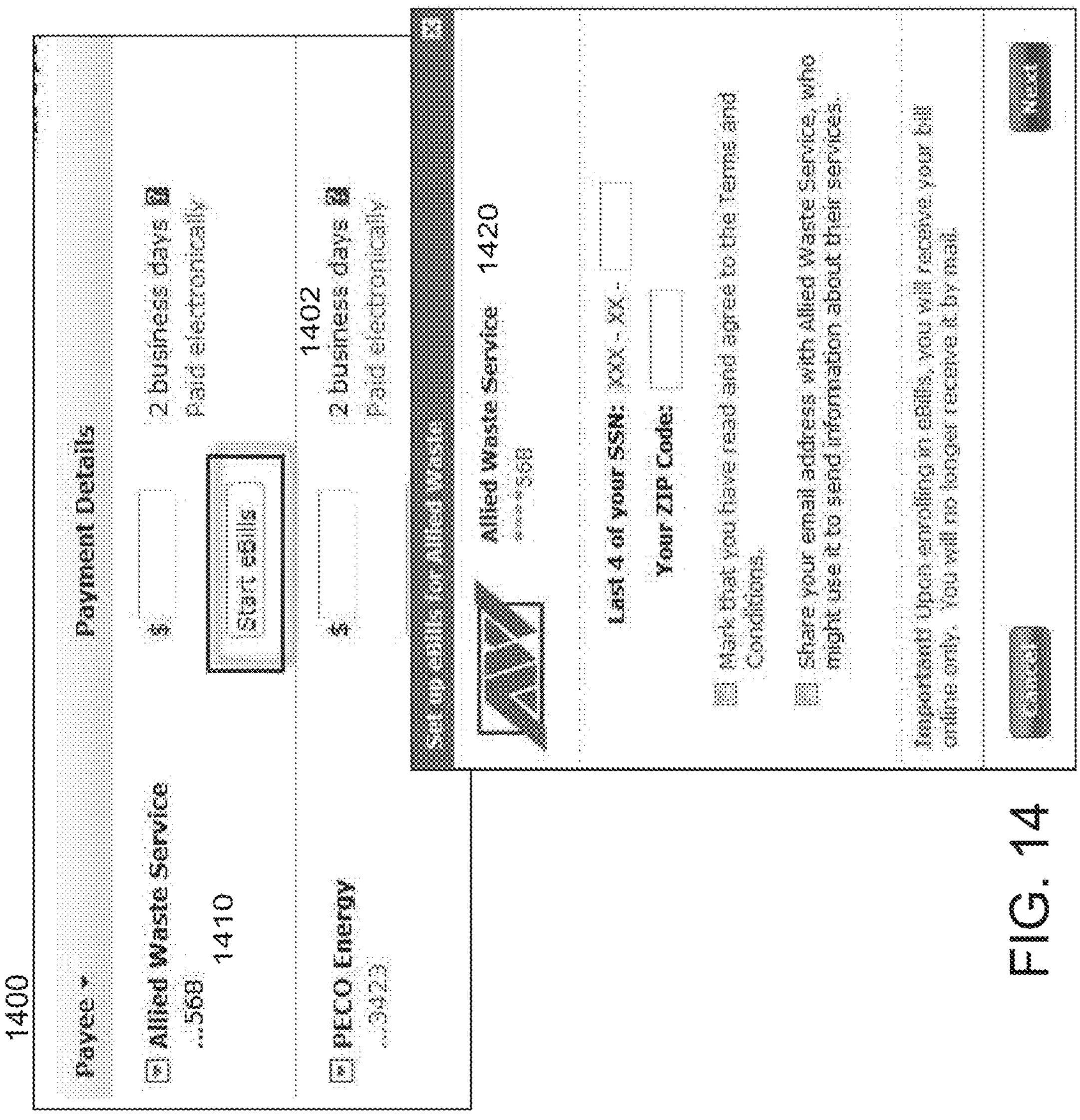
FIG. 14 is a user interface illustrating an electronic billing enrollment process in accordance with embodiments of the invention.

FIG. 14 is a user interface 1400 illustrating an electronic billing enrollment process in accordance with embodiments of the invention. The user interface 1400 may provide customers with an option 1402 to activate ebills when an eligible payee 1410 is selected. Upon selection to start eBills at 1402, a pop-up window 1420 may be provided to collect payer preferences and information. The pop-window may require some authentication measures and may also ask the payer to select preferences, such as whether or not the payer would like to provide the biller with information such as email address. Furthermore, if applicable, information in the pop-up window 1420 may advise the payer that enrollment in the electronic billing system terminates paper billing.

Figure 15:
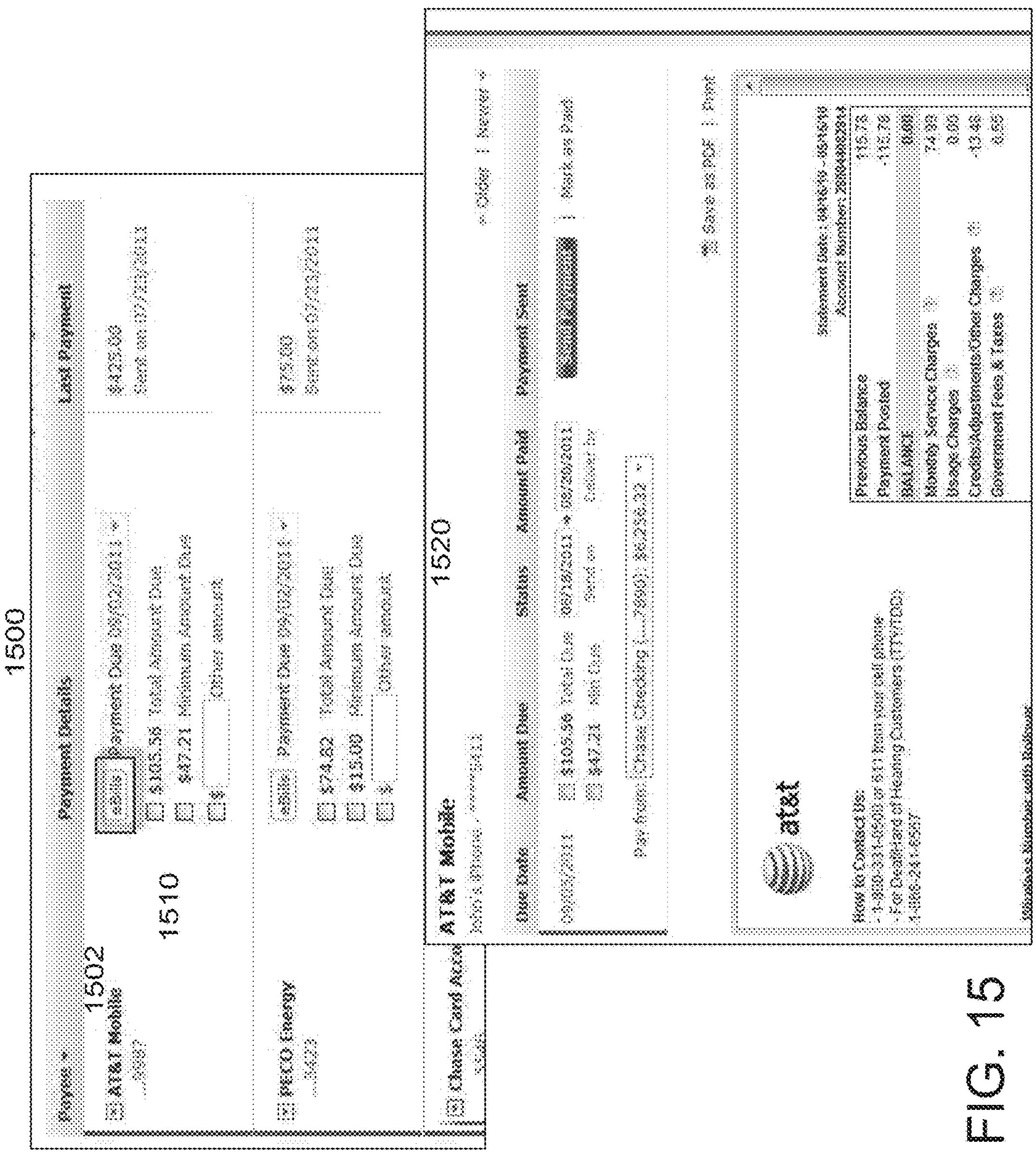
FIG. 15 is a user interface illustrating summary information for enrolled payees in accordance with an embodiment of the invention.

FIG. 15 is a user interface 1500 illustrating summary information for enrolled payees in accordance with an embodiment of the invention. Ebills for each payee 1502 are displayed at 1510. A billing detail 1520 may also be displayed. Thus, payers are provided with an ebills icon and summary information for each enrolled biller payee. The selection of the ebills icon provides each payer with more detailed information.

Figure 16:
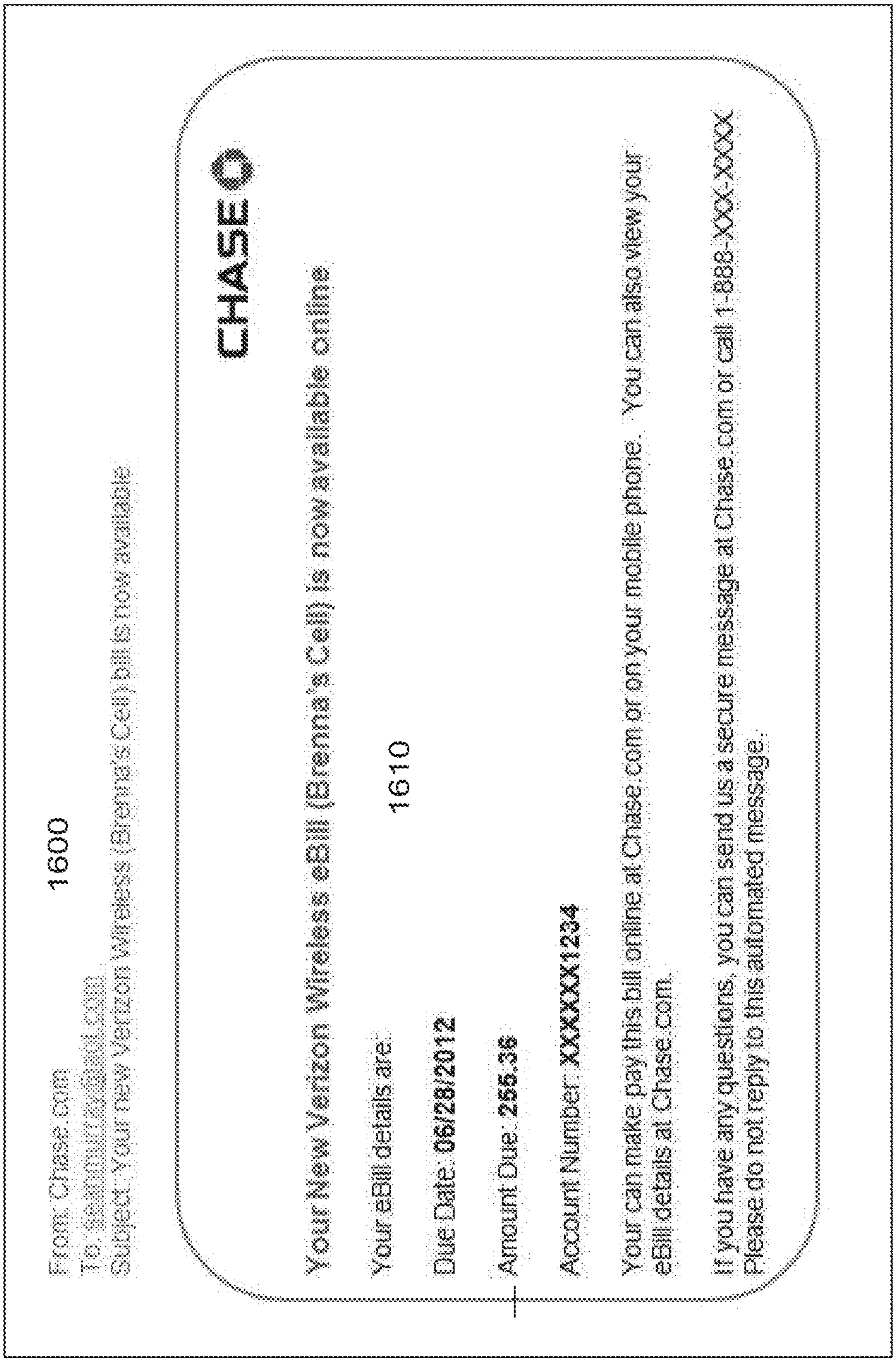
FIG. 16 is a user interface illustrating a notification generated by the host system in accordance with an embodiment of the invention.

FIG. 16 is a user interface 1600 illustrating a notification generated by the host system in accordance with an embodiment of the invention. Various notifications may be provided in accordance with embodiments of the invention, once host system customers enroll in the ebilling system. An illustrated notification 1610 informs the payer that an ebill is available online. Standard notifications may include, for example: ebill available; replacement ebill available; enrollment activation accepted; enrollment rejection; ebill trail period ends; ebills deactivated; and ebill account number changed. Other types of notifications are also within the scope of the invention.

Figure 17:
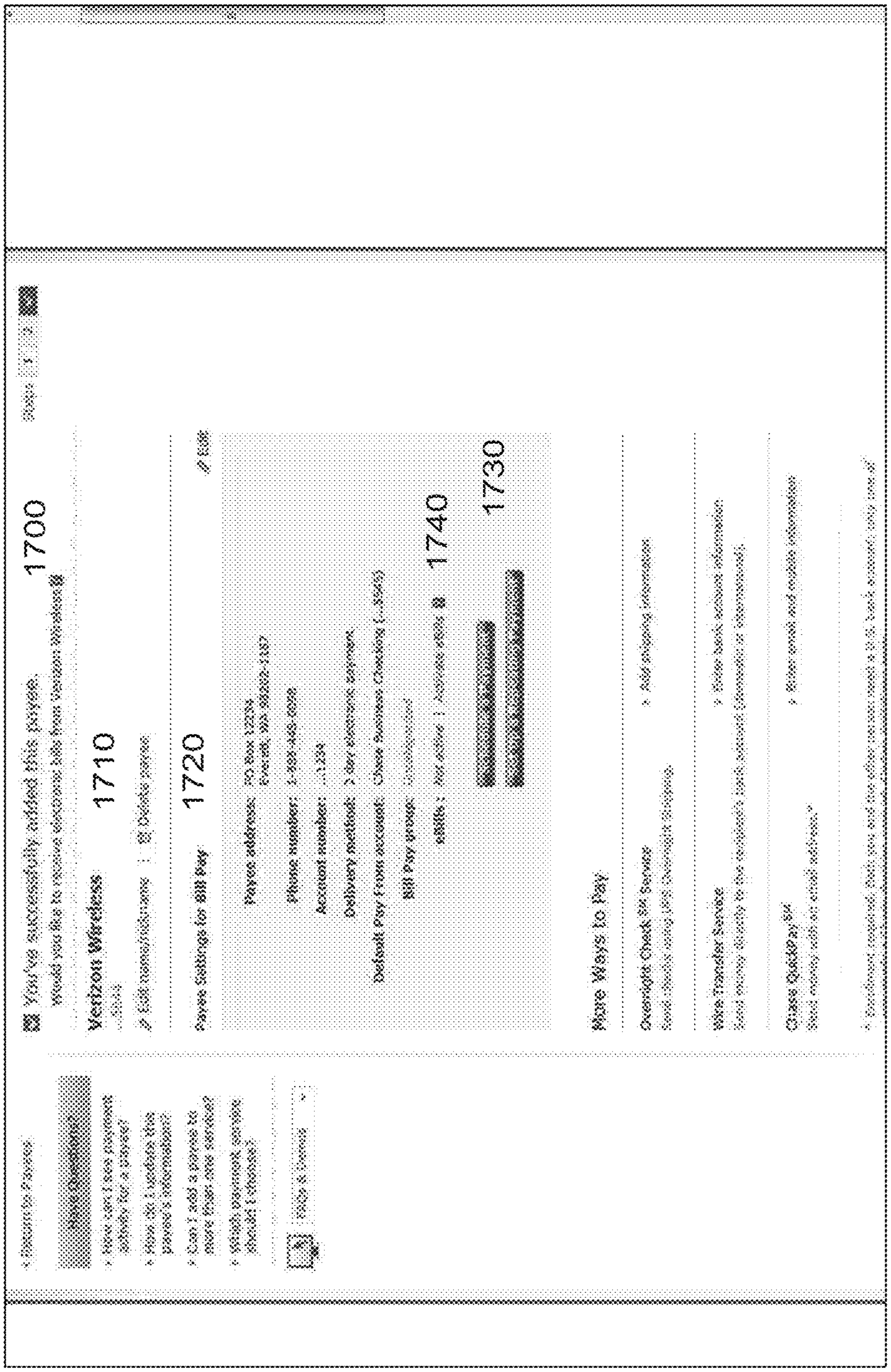
FIG. 17 is a user interface showing an added payee in accordance with an embodiment of the invention.

FIG. 17 is a user interface 1700 showing an added payee in accordance with an embodiment of the invention. The interface 1700 provides a confirmation message to the payer that the payee has successfully been added. The name of the payee is shown at 1710. The payer may adjust payee settings at 1720 and schedule or set up payments at 1730. A selectable option 1740 allows initiation of ebilling.

FIGS. 18-27 are user interfaces showing steps in a cash flow management process facilitated by the host system in accordance with embodiments of the invention. FIG. 28 illustrates a generalized cash flow management process 2800. As shown in FIG. 28, the biller may generate an estimate for goods or services at 2810. The estimate may be converted to an invoice 2815 upon approval and payment may be requested at 2820. Reports and accounting parameters related to the invoice may be generated at 2825. Payment for the invoice may be received at 2830. The payment may be reconciled with the invoice at 2835 and the estimate at 2840. The process is adapted to assist businesses with tracking of estimates so that the estimates are linked to the invoice and the payments and invoices are automatically reconciled. Accordingly, businesses avoid the necessity of reviewing bank and merchant statements to reconcile the phases of the process manually. The automated system enables businesses to better visualize a complete cash flow picture by managing cash flow throughout the process. Preferably, process management occurs in real time so that businesses are constantly aware of their cash flow situation.

Figure 18:
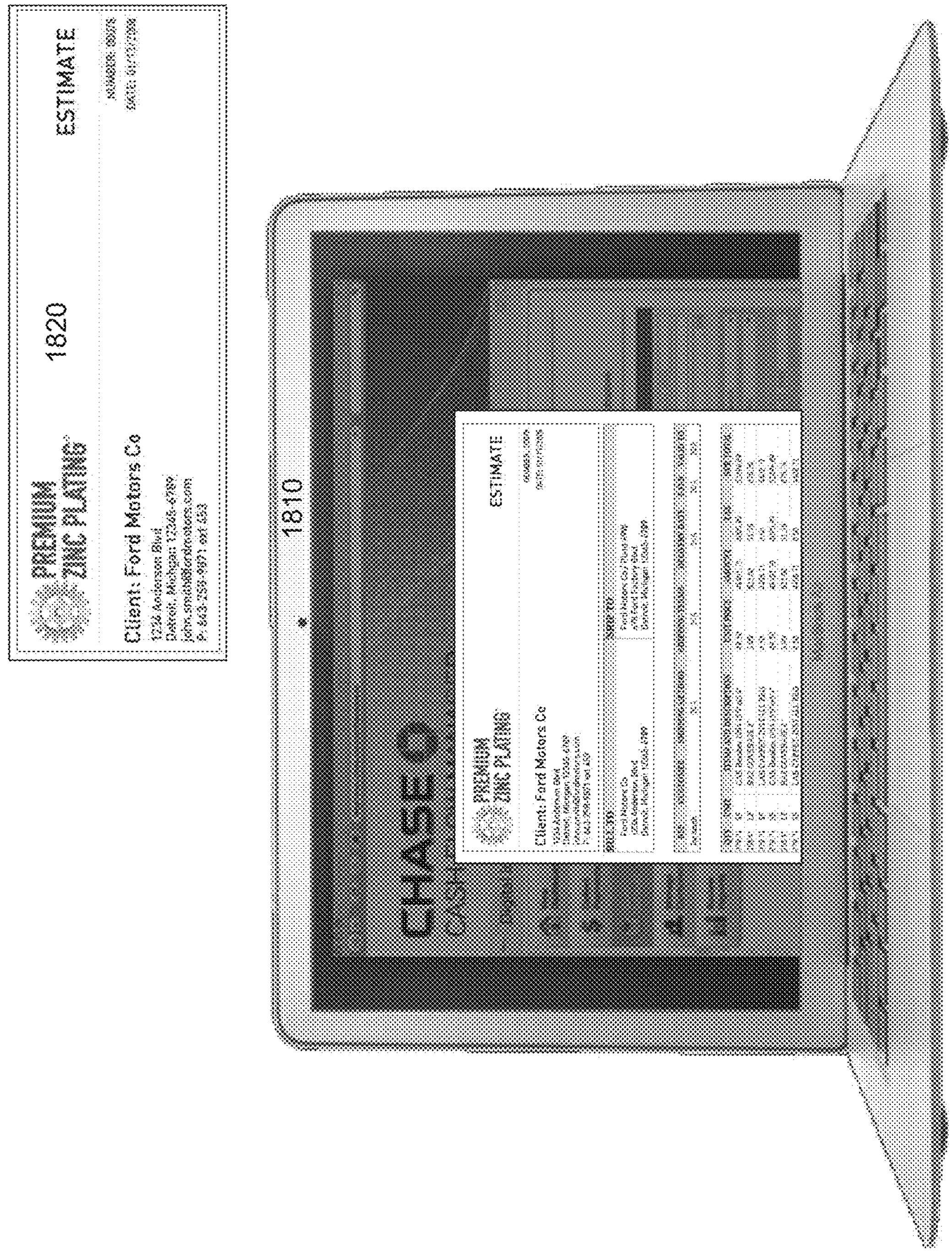
FIG. 18-27 are user interfaces showing steps in a cash flow management process facilitated by the host system in accordance with embodiments of the invention.

FIGS. 18-27 illustrate the cash flow management process generalized by FIG. 28. FIG. 18 illustrates an estimate 1800 generated by a business Premium Zinc Plating (PZP) that supports the automotive industry. The estimate is displayed through the system of the invention at 1810 and is forwarded to an automotive manufacture, such as Ford Motor Company™. The system of the invention provides an invoicing solution that allows the business to generate and forward the estimate.

Figure 19:
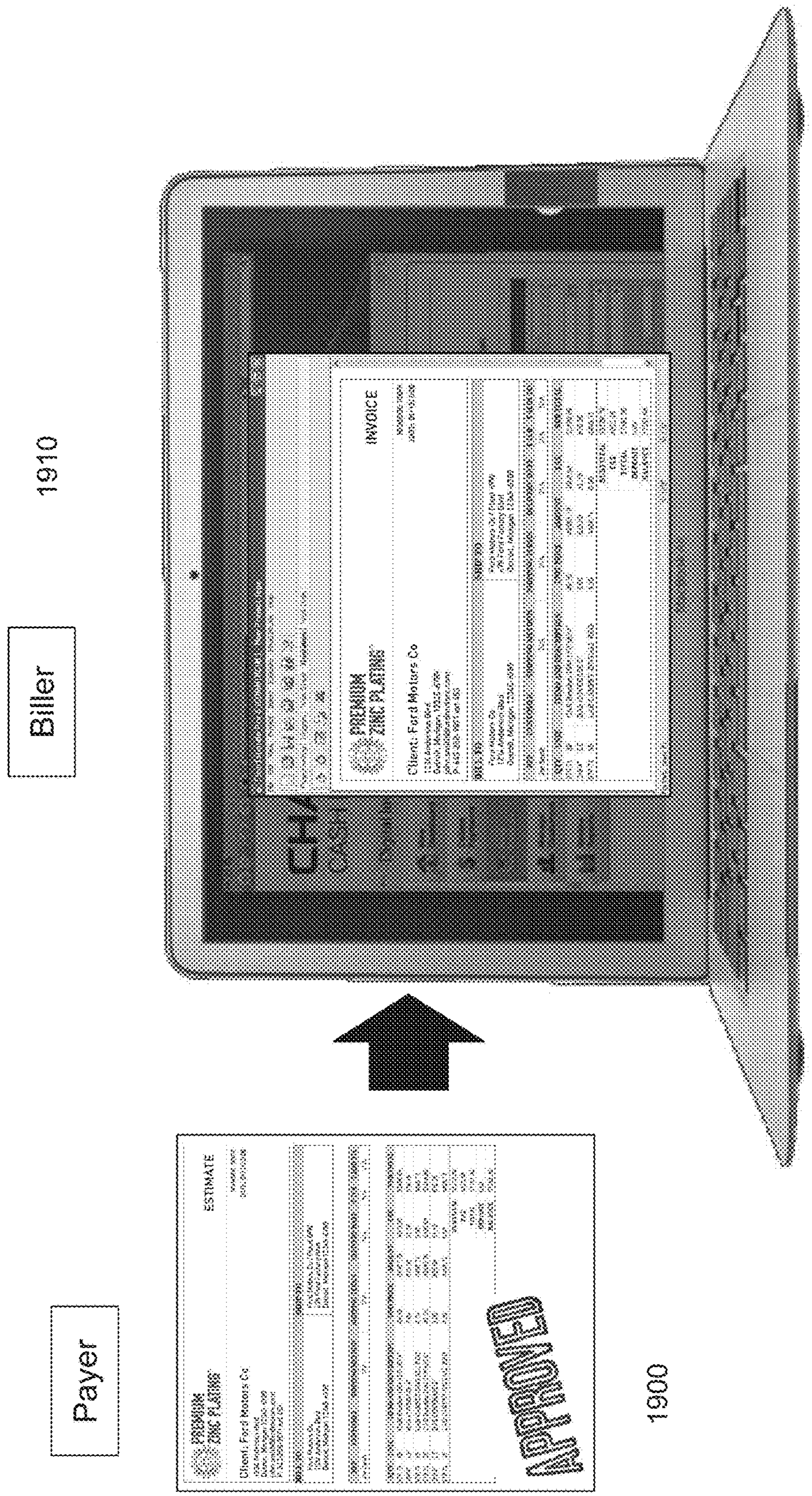

FIG. 19 illustrates that the payer, Ford Motor Company™, has approved the estimate at 1900 and the system automatically generates an invoice for an initial deposit 1910 and transmits it to the payer. Embodiments of the invention automatically update the biller's receivables in the biller's accounting system using the cash flow management system as described above. The process can eliminate extra days inherent in known manual processes.

Figure 20:
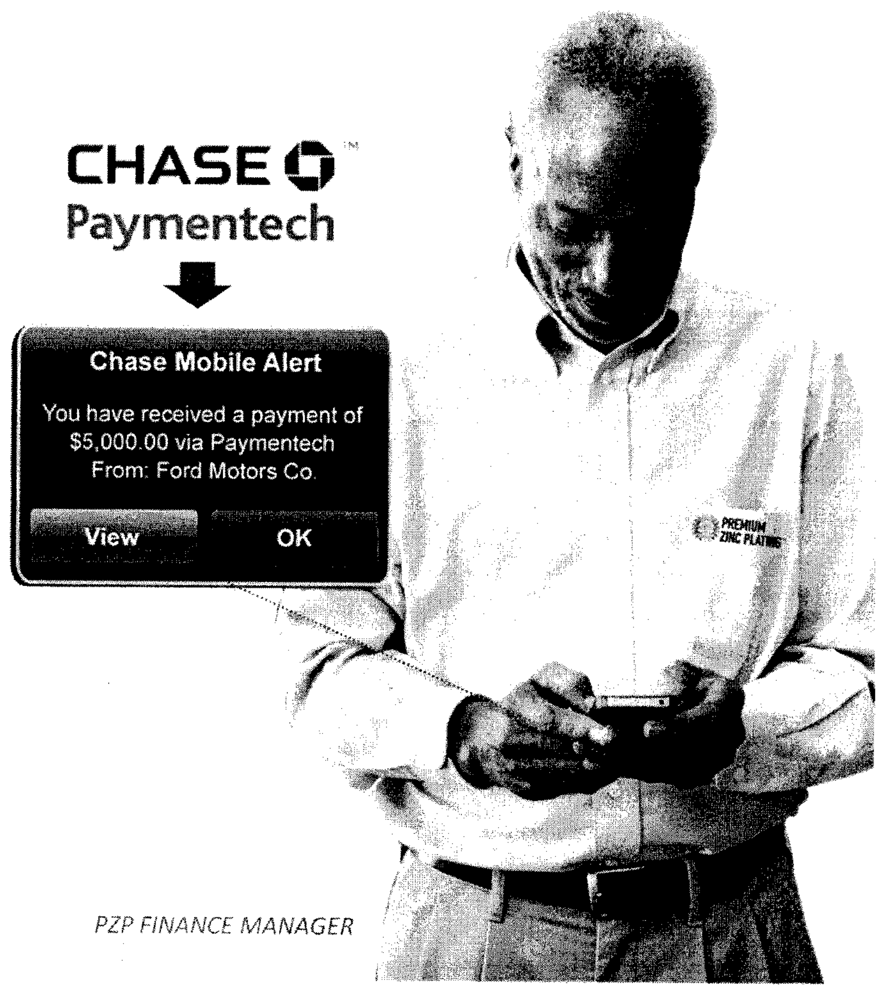

FIG. 20 illustrates a mobile alert 2000 that may be generated and delivered to the biller when any payment in connection with the invoice is received. The alert states at 2010 that the payment has been received and gives the biller viewer an opportunity to view additional details at 2020. The integrated receivables and reconciliation system described herein may match the payment with the invoice and communicate the information to the alerts generator to generate the displayed results. Furthermore, the cash flow management system has automatically updated the accounting system and cash flow summary when the alert is generated.

Figure 21:

Once the biller has been alerted that the payment has been received, business personnel for the biller PZP may begin sourcing materials for the project and utilizing a credit card 2100 to purchase the materials from a supplier as illustrated in FIG. 21. In embodiments of the invention, the credit card is preferably linked to a host system credit account, such that details of the credit purchase are linked to the overall process through the cash flow management system.

Figure 22:
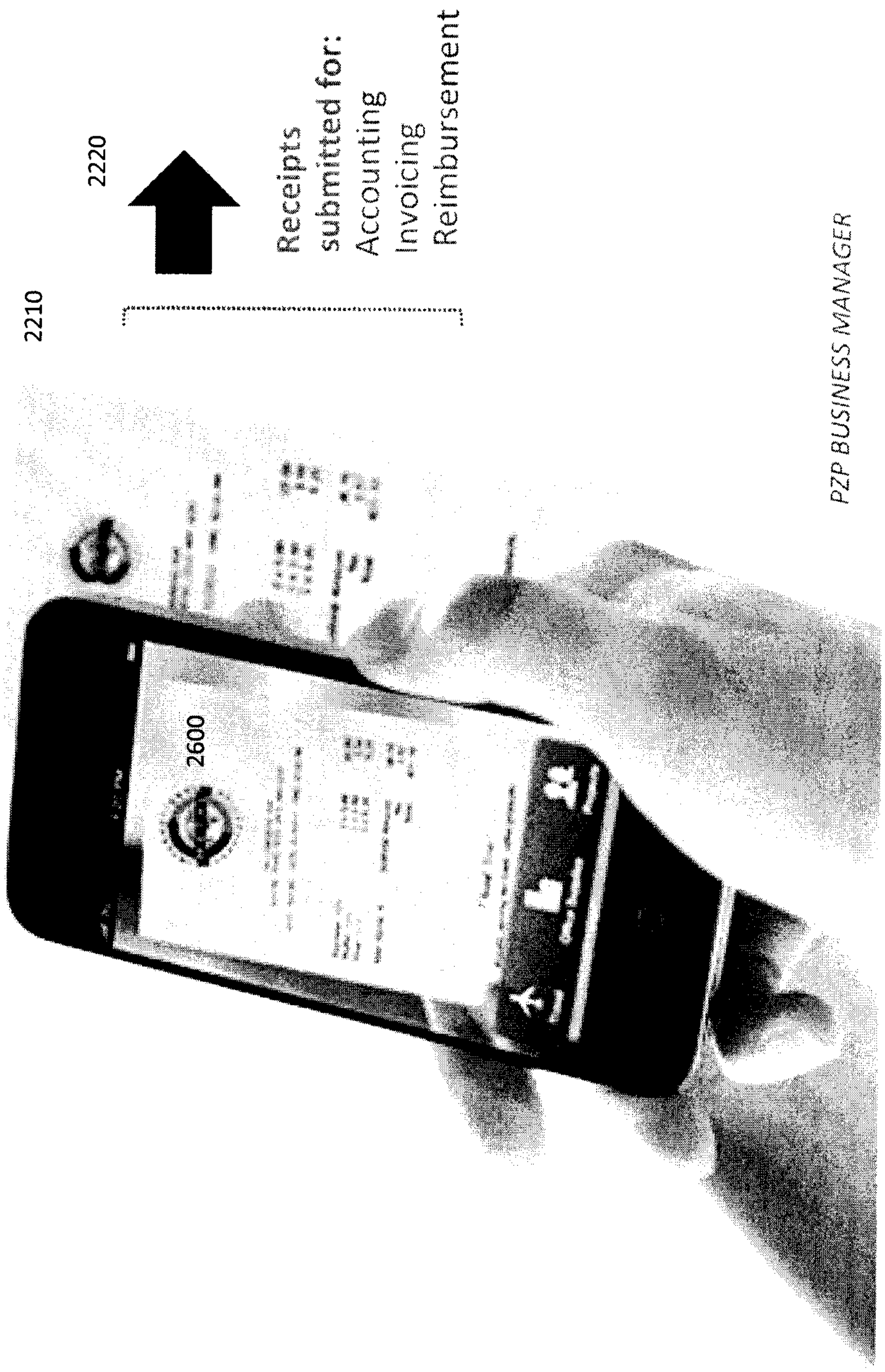

FIG. 22 illustrates the integration of a host expense management system with the cash flow management system. After the business personnel at the biller business PZP begins to make purchases, she captures the receipt at 2200 for the purchases and submits it to the expense management system, where she is able to categorize each expense and associate each expense with a project at 2210. The cash flow management system may then automatically obtain information from the expense management system and ensure that the receipts are submitted for accounting, invoicing, and reimbursement at 2220.

Figure 23:
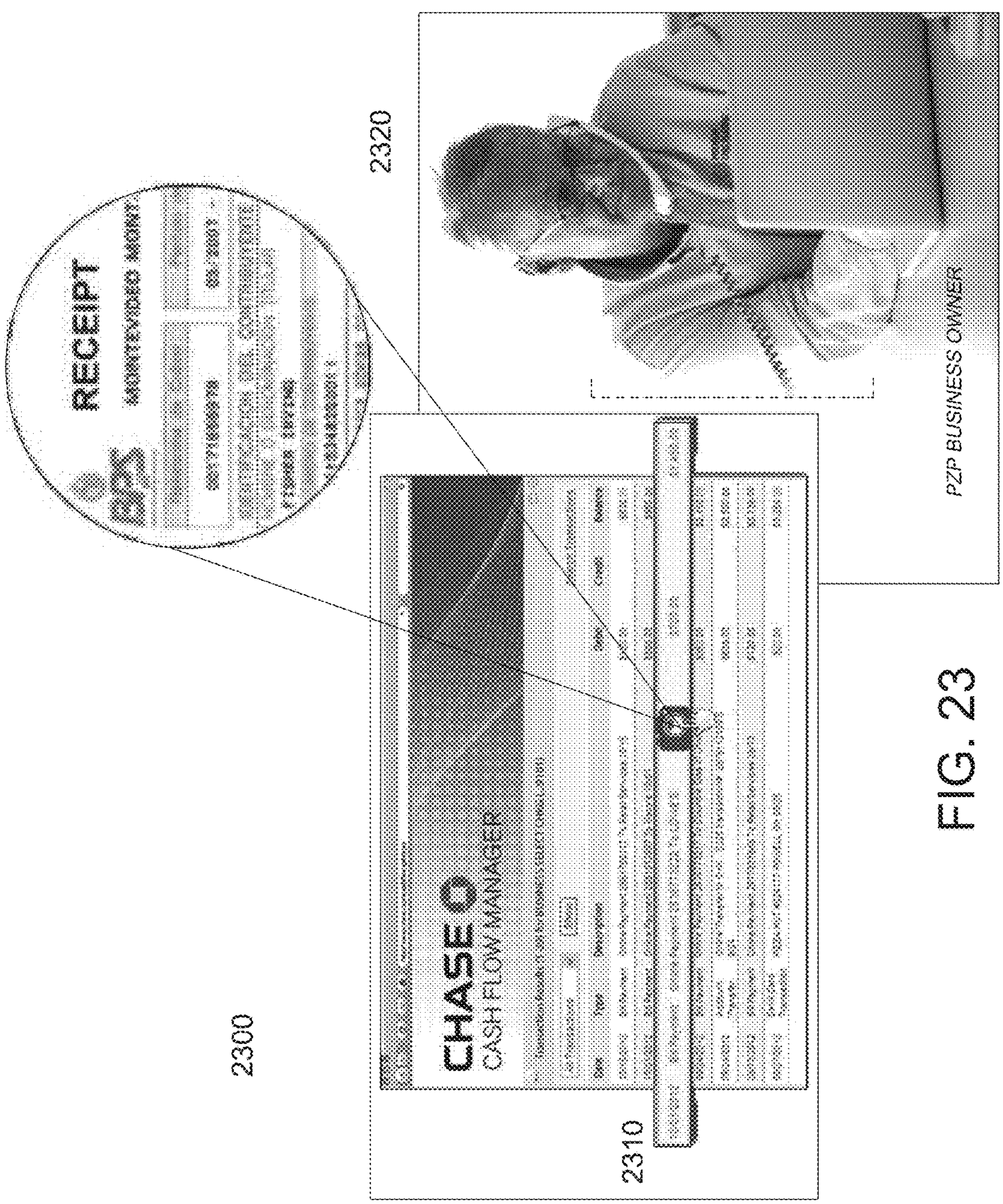

FIG. 23 illustrates business owner/manager access to the cash flow management system. The business owner sees the receipt and purchase information through a user interface 2300 linked to the cash flow management system. The information may be displayed, for example, on a web site generated by the host system. The business owner can view the expenses from a list of expenses 2310, view details of the transaction at 2320, and approve the expenses as categorized and stored in the expense management system. The cash flow management system automatically links the expenses to the original estimate for the project. Accordingly, the system renders rekeying of data unnecessary and reimbursements are managed automatically rather than manually.

Figure 24:
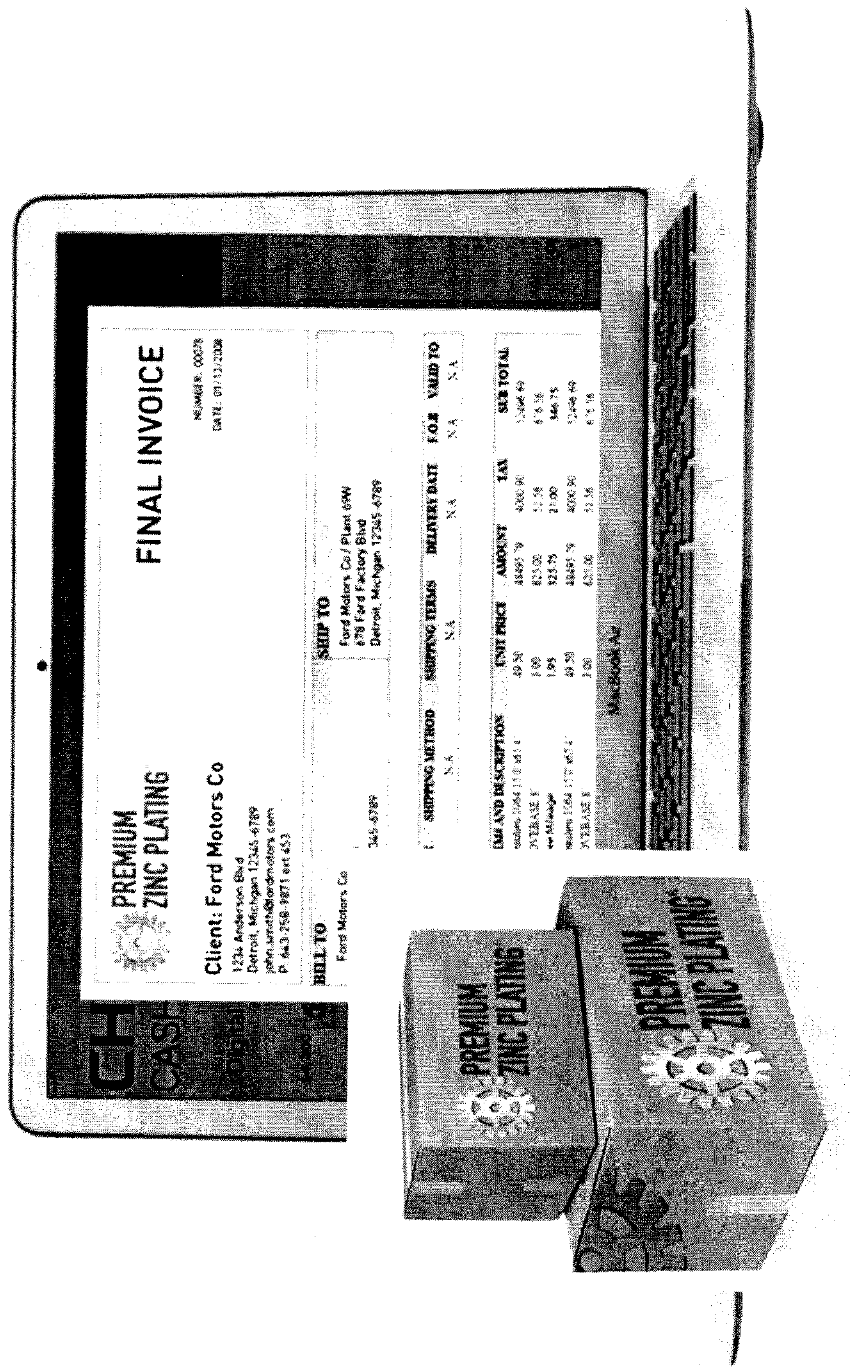

FIG. 24 illustrates generation of a final invoice 2400. PZP may send out the final invoice to the automobile manufacturer after producing and shipping the parts. The final invoice 2400 would likely include the manufacturing, material costs, and employee expenses related to the project.

Figure 25:
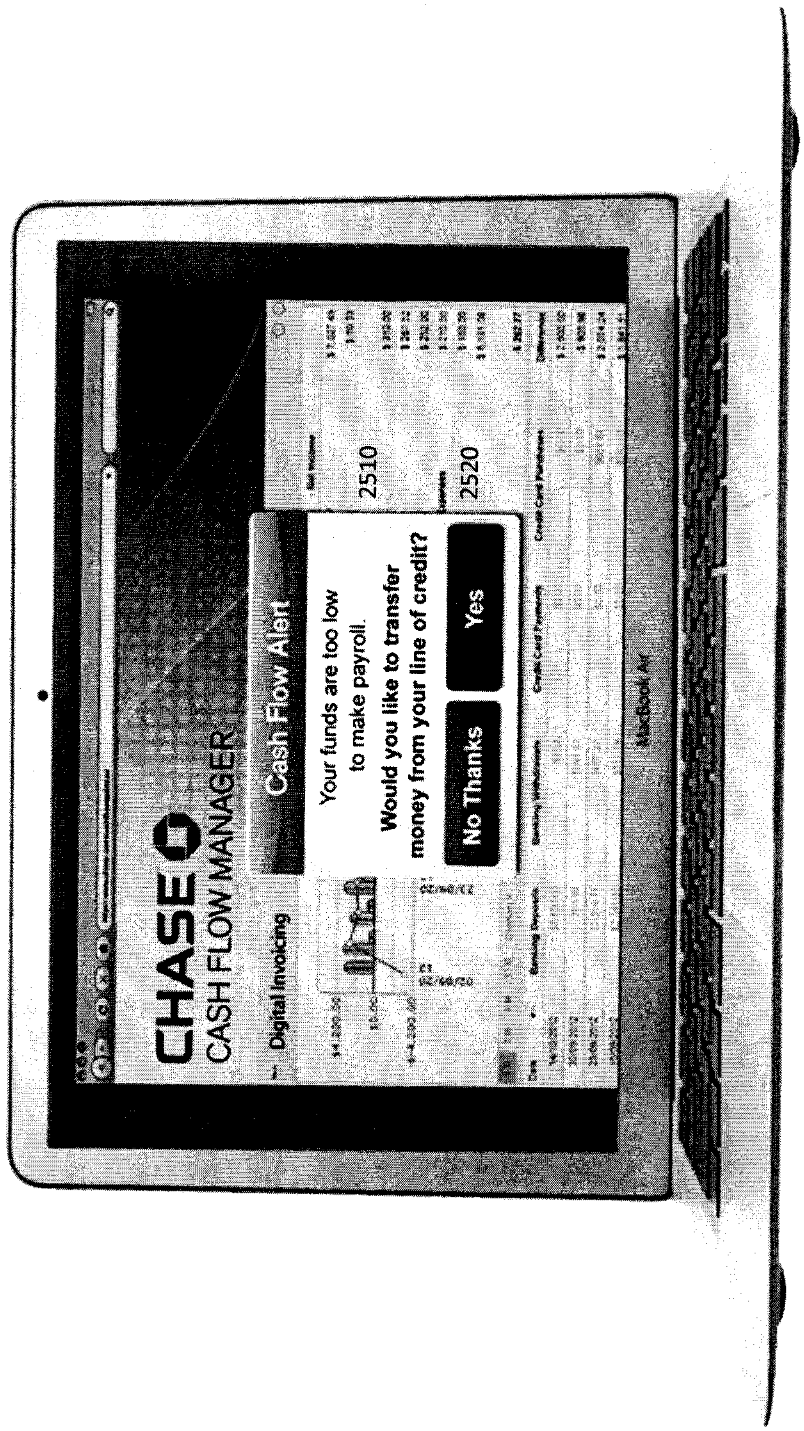

FIG. 25 illustrates the ability for PZP's business owner to use the cash flow management system to visualize cash flow, manage cash positions, and respond to generated alerts. For example, a user interface 2500 shows a generated alert 2510 that advises the business owner that funds are too low to make payroll. The alert also asks if the business owner would like to transfer money from his line of credit and offers the option to accept or decline at 2520. In embodiments of the invention, if the business owner did not have a line of credit, the cash flow management system may receive offer information for credit from the offer generator and display the offer, preferably with a link to accept the offer.

Figure 26:
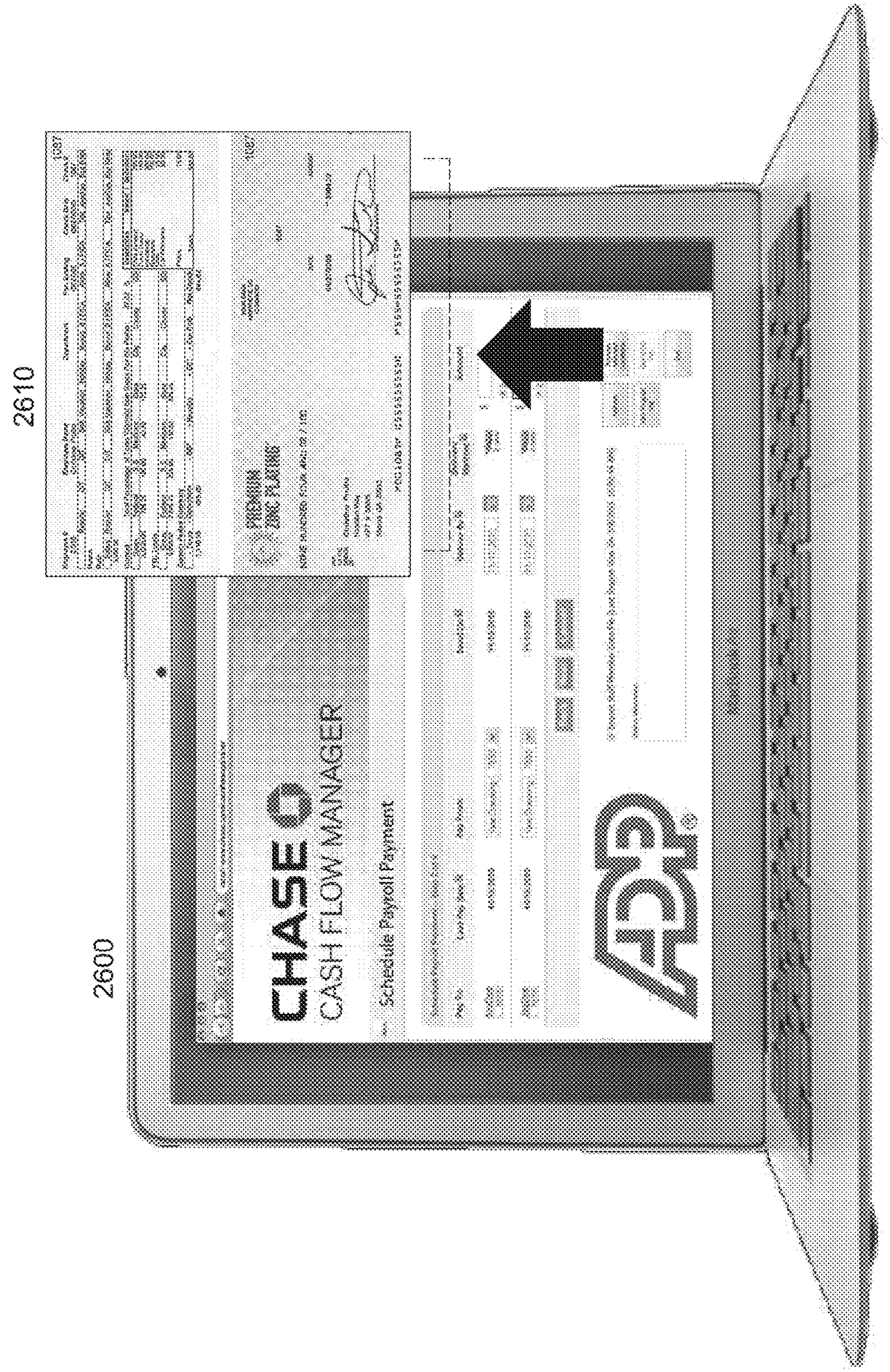

FIG. 26 illustrates integration of the cash flow management system with the payroll system offered by the host system. In the illustrated example, PZs finance manager uses the payroll system via a user interface 2600 to administer payroll and employee expenses via direct deposit, including personal mileage for the project at 2610.

Figure 27:
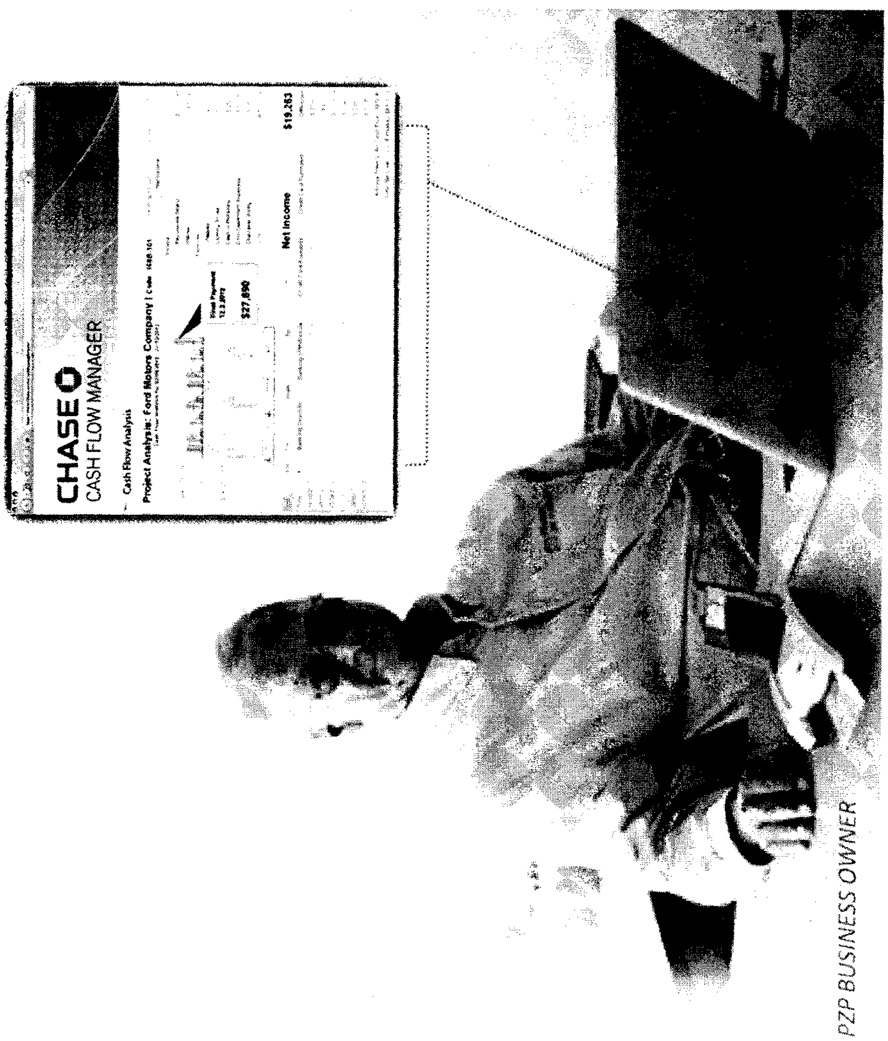
Figure 28:
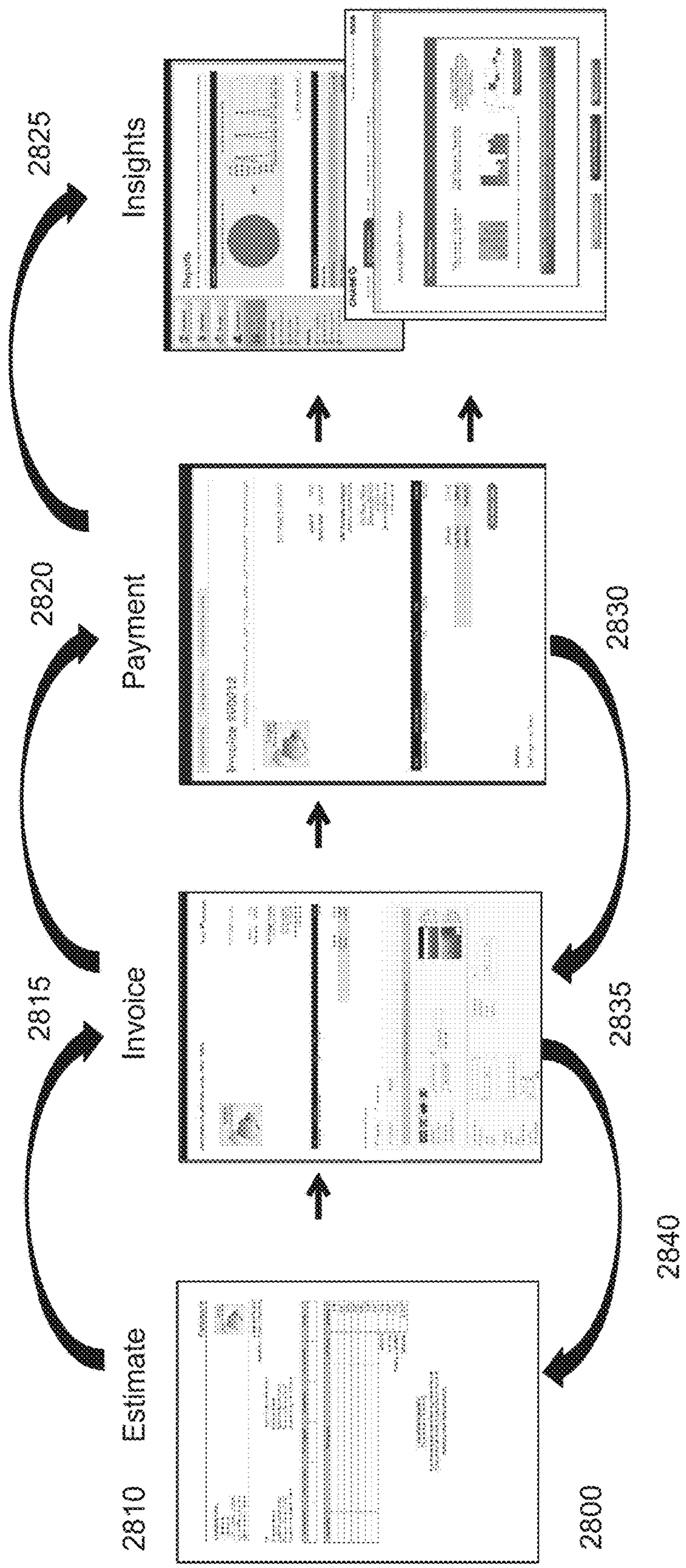
FIG. 28 is a flow chart illustrating a generalized cash flow management method in accordance with embodiments of the invention.

FIG. 27 illustrates an analysis 2700 that may be produced by the cash flow management system. For example, sixty days after invoicing, PZP receives a check from the automobile manufacturer for the final invoice. The final invoice may be deposited from the office by the use of a host imaging deposit system such as QuickDeposit™. The cash flow management system can then automatically update the accounting system, allowing the business owner to visually track the income of the project and the business cash flow through a user interface on a web site operated by the host system. Accordingly, the business owner is able to see an up-to-date view of the current cash flow situation.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A host system for facilitating bill payment and reconciliation, the host system comprising:

an external systems interface for communicating over a network with systems external to the host system including at least one biller accounting system;

at least one computer memory storing data, the data including business data received over the network through the external systems interface and consumer data;

an electronic billing and invoicing computing system including at least one computer processor accessing the stored data and executing stored instructions to perform steps comprising:

generating electronic invoices on behalf of businesses for goods or services provided to consumers; and transmitting the electronic invoices to the consumers using at least one of multiple selectable transmission methods including at least sending push notifications received at consumer mobile devices, wherein the push notifications allow payment by the consumer through the consumer mobile device over the Internet without consumer login;

an integrated receivables and reconciliation computing system including at least one computer processor performing steps comprising:

receiving notifications of consumer payment of the invoices through one of multiple selectable payment methods, the multiple selectable payment methods including multiple payment sources and multiple payment channels, at least some of the received notifications generated resultant to payments responsive to the push notifications; and capturing and scanning the generated invoice to identify a unique identifier included in the generated invoice;

determining when each of the received payment is linked to a generated invoice based on the identified unique identifier;

automatically matching one or more of each of the consumer invoice payment with the generated invoices based on one or more business rules, when the determination indicates that the one or more of the consumer invoice payment is not linked to the generated invoice;

providing user interfaces for billers, the user interfaces including real time cash flow information based on the matching; and a cash flow management system including at least one computer processor performing steps comprising:

connecting over the network with a biller accounting system external to the host system; and utilizing a bi-directional application program interface for automatically updating business accounting records contained within the biller accounting system external to the host system based on each matched payment and invoice.

2. The system of claim 1, automatically updating and displaying the payment amount when the determination indicates that the one or more of the consumer invoice payment is linked to the generated invoice.

3. The system of claim 1, wherein the steps further comprise generating a dashboard interface displaying the automatically matched payments to the business and requesting confirmation of the automatically matched payments prior to updating of business accounting records.

4. The system of claim 1, wherein accessing the data comprises accessing consumer data, and further comprising analyzing the consumer data to generate a targeted offer to the consumer and embedding the targeted offer in the electronic invoice.

5. The system of claim 4, wherein the targeted offer includes a URL and consumers can select the targeted offer on the electronic invoice to visit a web page referenced by the URL.

6. The system of claim 1, wherein the selectable payment sources comprise credit card, debit card, and bank account.

7. The system of claim 1, wherein the selectable payment channels include paper check, online bill pay through the host system, online bill pay through a third party aggregator, and online payment service.

8. The system of claim 7, wherein when payment is through check, prior to matching, deposit of payment is received through one of image capture and branch deposit.

9. A method executed by a host system for facilitating bill payment and reconciliation, the method comprising:

receiving, through an external systems interface, information over a network from systems external to the host system including at least one biller accounting system;

storing data, the data received through the external systems interface and including both business data and consumer data in at least one computer memory;

accessing the stored data and executing stored instructions using at least one computer processor of an electronic billing and invoicing computing system to perform steps including:

generating electronic invoices on behalf of businesses for goods or services provided to consumers;

transmitting the electronic invoices to the consumers using at least one of multiple selectable transmission methods including at least sending push notifications received at consumer mobile devices, wherein the push notifications allow payment by the consumer through the consumer mobile device over the Internet without consumer login;

using at least one computer processor of an integrated receivables and reconciliation computing system for performing steps comprising:

receiving notifications notification of consumer payment of the invoices through one of multiple selectable payment methods, the multiple selectable payment methods including multiple payment sources and multiple payment channels, at least some of the received notifications notification generated resultant to payments responsive to the push notifications;

capturing and scanning the generated invoice to identify a unique identifier included in the generated invoice;

determining when each of the received payment is linked to a generated invoice based on the identified unique identifier;

automatically matching one or more of each of the consumer invoice payment with the generated invoices based on one or more business rules, when the determination indicates that the one or more of the consumer invoice payment is not linked to the generated invoice;

providing user interfaces for billers, the user interfaces including real time cash flow information based on the matching; and utilizing at least one computer processor of a cash flow management system for performing operations comprising:

connecting over a network with the biller accounting system external to the host system; and utilizing a bi-directional application program interface for automatically updating business accounting records contained within the biller accounting system external to the host system based on each matched payment and invoice.

10. The system of claim 9, automatically updating and displaying the payment amount when the determination indicates that the one or more of the consumer invoice payment is linked to the generated invoice.

11. The method of claim 9, further comprising generating a dashboard interface displaying the automatically matched payments to the business and requesting confirmation of the automatically matched payments prior to updating of business accounting records.

12. The method of claim 9, wherein accessing the data comprises accessing consumer data, and further comprising analyzing the consumer data to generate a targeted offer to the consumer and embedding the targeted offer in the electronic invoice.

13. The method of claim 12, wherein the targeted offer includes a URL and consumers can select the targeted offer on the electronic invoice to visit a web page referenced by the URL.

14. The method of claim 9, wherein the selectable payment sources comprise credit card, debit card, and bank account.

15. The method of claim 9, wherein the selectable payment channels include paper check, online bill pay through the host system, online bill pay through a third party aggregator, and online payment service.

16. The method of claim 15, wherein when payment is through check, prior to matching, deposit of payment is received through one of image capture and branch deposit.

17. The system of claim 1, wherein the cash flow management system generates alerts based on information received through the external systems interface from the accounting system that cash flow is insufficient to meet cash demand.

18. The system of claim 1, wherein the electronic billing and invoicing computing system includes a donation processor for allowing donations through ebill payments.

19. The system of claim 1, wherein the external systems interface communications over one or more networks with multiple financial systems including a payroll system, an expense management system, and a card processing system.

20. The system of claim 19, wherein the cash flow management system generates alerts based on a current cash flow situation.

21. The system of claim 20, wherein the cash flow management system generates an alert based on consolidated information from the biller accounting system and the payroll system indicating that cash flow shown by the accounting system is insufficient to meet cash required by the payroll system.

22. The system of claim 21, wherein the alert advises of insufficient cash flow and offers a line of credit product.

23. The system of claim 1, wherein the cash flow management system generates a notification to each business when a payment is received for that business and automatically updates a cash flow summary for the business.

24. The method of claim 9, further comprising automatically generating alerts based on information received over the network through the external systems interface from the biller accounting system that cash flow is insufficient to meet cash demand.

25. The method of claim 9, further comprising generating and transmitting electronic bills based on business invoices and displaying the generated bills for payment.

26. The method of claim 9, further comprising implementing a donation processor for allowing donations through ebill payments.

27. The method of claim 9, further comprising communicating over one or more networks with multiple financial systems accessible to the host system using the external systems interface to update the systems upon receipt of payment for the generated invoices wherein the multiple financial systems include a payroll system, an expense management system, and a card processing system.

28. The method of claim 27, wherein the cash flow management system generates alerts based on a current cash flow situation.

29. The method of claim 27, further comprising generating an alert based on consolidated information from the biller accounting system and the payroll system indicating that cash flow shown by the accounting system is insufficient to meet cash required by the payroll system.

30. The method of claim 29, wherein the alert advises of insufficient cash flow and offers a line of credit product.

31. The system of claim 9, wherein the cash flow management system generates a notification to each business when a payment is received for that business and automatically updates a cash flow summary for the business.

32. The method of claim 27, further comprising associating expenditures recorded by the expense management system to a particular bill transmitted to a payer.

* * * * *